U011586810B2

United States Patent
Wu et al.

(10) Patent No.: US 11,586,810 B2
(45) Date of Patent: Feb. 21, 2023

(54) GENERATING RESPONSES IN AUTOMATED CHATTING

(71) Applicant: MICROSOFT TECHNOLOGY LICENSING, LLC, Redmond, WA (US)

(72) Inventors: Xianchao Wu, Redmond, WA (US); Zhan Chen, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 352 days.

(21) Appl. No.: 16/626,283

(22) PCT Filed: Jun. 26, 2017

(86) PCT No.: PCT/CN2017/090010
§ 371 (c)(1),
(2) Date: Dec. 23, 2019

(87) PCT Pub. No.: WO2019/000170
PCT Pub. Date: Jan. 3, 2019

(65) Prior Publication Data
US 2020/0159997 A1  May 21, 2020

(51) Int. Cl.
G06F 40/30 (2020.01)
H04L 51/02 (2022.01)
G06F 40/20 (2020.01)
G06N 3/04 (2023.01)
G06N 3/088 (2023.01)

(52) U.S. Cl.
CPC .............. *G06F 40/20* (2020.01); *G06F 40/30* (2020.01); *G06N 3/0454* (2013.01); *G06N 3/088* (2013.01); *H04L 51/02* (2013.01)

(58) Field of Classification Search
None
See application file for complete search history.

(56) References Cited

U.S. PATENT DOCUMENTS 9,430,738 B1    8/2016  Hui et al.
2016/0342702 A1  11/2016  Barve et al.
2017/0024645 A1  1/2017  Socher et al.
(Continued)

FOREIGN PATENT DOCUMENTS

CN  104572619 A   4/2015
CN  105095195 A   11/2015
(Continued)

OTHER PUBLICATIONS

International Search Report and Written Opinion for PCT/CN2017/090010, dated Mar. 23, 2018.
(Continued)

*Primary Examiner* — Quynh H Nguyen
(74) *Attorney, Agent, or Firm* — Workman Nydegger

(57) ABSTRACT

The present disclosure provides method and apparatus for generating responses in automated chatting. A message may be received in a session. An intention vector may be determined based at least on the message and the session through dynamic memory network (DMN), the intention vector indicating an attention point and an intention. A response may be generated based at least on the intention vector.

20 Claims, 10 Drawing Sheets

(56) References Cited

U.S. PATENT DOCUMENTS

| | | | |
|---|---|---|---|
| 2017/0160813 A1 | 6/2017 | Divakaran et al. | |
| 2018/0129742 A1* | 5/2018 | Li | G06V 30/194 |

FOREIGN PATENT DOCUMENTS

| | | |
|---|---|---|
| CN | 105677822 A | 6/2016 |
| CN | 106503101 A | 3/2017 |

OTHER PUBLICATIONS

"Extended Search Report Issued in European Patent Application No. 17915810.0", dated Oct. 20, 2020, 9 Pages. (Ms# 402456-EP-EPT).

Zhou, et al., "Emotional Chatting Machine: Emotional Conversation Generation with Internal and External Memory", In Repository of arXiv:1704.01074v2, Apr. 19, 2017, 11 Pages.

Kumar, et al., "Ask Me Anything: Dynamic Memory Networks for Natural Language Processing", In Repository of arXiv:1506.07285v1, Jun. 24, 2015, 10 Pages.

Wu, et al., "Haiku Generation Using Deep Neural Networks", In Proceedings of the 23rd Annual Meeting of the Association for Natural Language Processing, Mar. 17, 2017, 4 Pages.

Yu, et al., "SeqGAN: Sequence Generative Adversarial Nets with Policy Gradient", In Proceedings of the 31st AAAI Conference on Artificial Intelligence, Dec. 9, 2016, 10 Pages.

Britz, Denny, "Deep Learning for Chatbots, Part 2—Implementing a Retrieval-Based Model in Tensorflow", Retrieved from http://www.wildml.com/2016/07/deep-learning-for-chatbots-2-retrieval-based-model-tensorflow/, Jul. 4, 2016, 16 Pages.

Brown, et al., "The Mathematics of Statistical Machine Translation: Parameter Estimation", In Journal of Computational Linguistics, vol. 19, Issue 2, Jun. 1, 1993, pp. 263-311.

Cho, et al., "Learning Phrase Representations using RNN Encoder-Decoder for Statistical Machine Translation", In Repository of arXiv:1406.1078v3, Sep. 3, 2014, 15 Pages.

Collobert, et al., "Natural Language Processing (Almost) from Scratch", In Journal of Machine Learning Research, vol. 12, Aug. 2011, pp. 2493-2537.

Cun, et al., "Handwritten Digit Recognition with a Back-Propagation Network", In Proceedings of Advances in Neural Information Processing Systems, Jun. 1990, pp. 396-404.

Devlin, Hannah, "Human-Robot Interactions Take Step Forward with 'Emotional' Chatbot", Retrieved from https://www.theguardian.com/technology/2017/may/05/human-robot-interactions-take-step-forward-with-emotional-chatting-machine-chatbot, May 5, 2017, 03 Pages.

Hochreiter, et al., "Long Short-Term Memory", In Journal of Neural Computation, vol. 9, Issue 8, Nov. 15, 1997, 32 Pages.

Kim, et al., "Character-Aware Neural Language Models", In Proceedings of the Thirtieth AAAI Conference on Artificial Intelligence, Mar. 5, 2016, pp. 2741-2749.

Lungu, Valentin, "Artificial Emotion Simulation Techniques for Intelligent Virtual Characters", In Publication of Bucharest Research Report, Jan. 2012, 75 Pages.

Mikolov, et al., "Distributed Representations of Words and Phrases and their Compositionality", In Proceedings of the 26th International Conference on Advances in Neural Information Processing Systems, vol. 2, Dec. 5, 2013, 9 Pages.

Pautler, David, "The 6 Evolutionary Stages of Chatbot AI", Retrieved from https://medium.com/@intentionperception/the-6-evolutionary-stages-of-chatbot-ai-d67ddabdebf, May 20, 2016, 5 Pages.

Surmenok, Pavel, "Chatbot Architecture", Retrieved from https://medium.com/@surmenok/chatbot-architecture-496f5bf820ed, Sep. 11, 2016, 8 Pages.

Wu, et al., "Sentiment Analysis with Eight Dimensions for Emotional Chatbots", In Proceedings of the Natural Language Process Conference, 2017, pp. 791-794.

"Office Action Issued in European Patent Application No. 17915810.0", dated Jun. 1, 2022, 7 Pages.

"First Office Action Issued in Chinese Patent Application No. 201780064420.8", dated Sep. 19, 2022, 21 Pages.

* cited by examiner

GENERATING RESPONSES IN AUTOMATED CHATTING

This application is a U.S. National Stage Application of PCT/CN2017/090010, filed Jun. 26, 2017, which application is hereby incorporated by reference. To the extent appropriate, a claim of priority is made to the above disclosed application.

BACKGROUND

Artificial Intelligence (AI) chatbot is becoming more and more popular, and is being applied in an increasing number of scenarios. The chatbot is designed to simulate people's conversation, and may chat with users by text, speech, image, etc. Generally, the chatbot may scan for keywords within a message input by a user or apply natural language processing on the message, and provide a response with the most matching keywords or the most similar wording pattern to the user.

SUMMARY

This Summary is provided to introduce a selection of concepts that are further described below in the Detailed Description. It is not intended to identify key features or essential features of the claimed subject matter, nor is it intended to be used to limit the scope of the claimed subject matter.

Embodiments of the present disclosure propose method and apparatus for generating responses in automated chatting. A message may be received in a session. An intention vector may be determined based at least on the message and the session through dynamic memory network (DMN), the intention vector indicating an attention point and an intention. A response may be generated based at least on the intention vector.

It should be noted that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

BRIEF DESCRIPTION OF THE DRAWINGS

The disclosed aspects will hereinafter be described in connection with the appended drawings that are provided to illustrate and not to limit the disclosed aspects.

DETAILED DESCRIPTION

Figure 1:
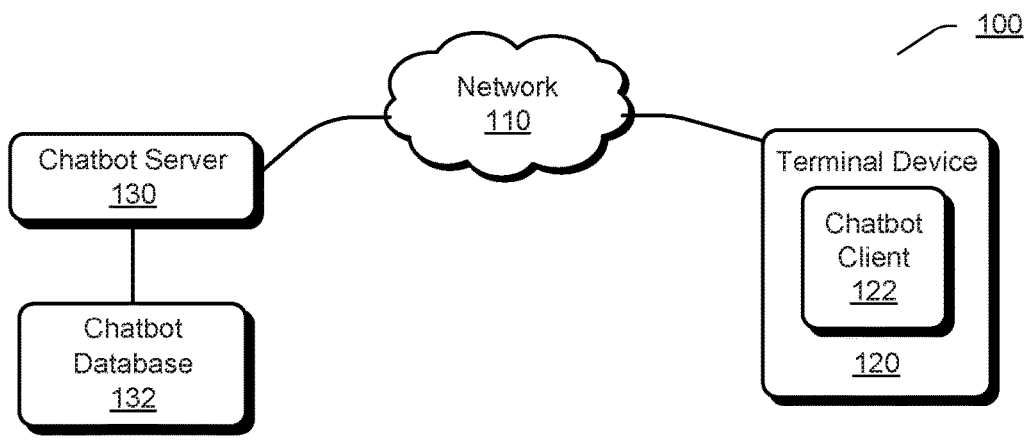
FIG. 1 illustrates an exemplary application scenario of a chatbot according to an embodiment.

The present disclosure will now be discussed with reference to several example implementations. It is to be understood that these implementations are discussed only for enabling those skilled in the art to better understand and thus implement the embodiments of the present disclosure, rather than suggesting any limitations on the scope of the present disclosure.

A chatbot may have a session with a user automatically. Herein, "session" may refer to a time-continuous dialog between two chatting participants and may include messages and responses in the dialog, wherein "message" refers to any information input by the user, e.g., queries from the user, answers of the user to questions from the chatbot, opinions of the user, etc., and "response" refers to any information provided by the chatbot, e.g., answers of the chatbot to questions from the user, comments of the chatbot, etc. The session between the chatbot and the user may involve description of facts. Herein, "fact" may refer to matters or affairs stated in a session, such as, a thing having happened or having been done in real word, a thing to be happened in real word, a thing or idea in the mind, a judgment, etc. Moreover, the user may express emotions on the facts during chatting with the chatbot. Herein, "emotion" may refer to the user's preferences or emotional opinions on facts, which may be classified as positive, negative or neutral, or classified in a finer granularity as surprise, disgusted, angry, etc. For example, as for a message input by the user "I like to eat Natto as my breakfast and it is healthy", this message includes a fact "eat Natto as breakfast" and an emotion "like".

Based on facts and emotions, attention points and intentions may be derived. Herein, "attention point" may refer to an active focus, topic or fact that is discussed currently and a corresponding emotion, and "intention" may refer to reasons or purposes behind an attention point. As for the above exemplary message, an attention point may be "like Natto" and an intention may be "for healthy".

Attention points and intentions may be helpful for the chatbot to generate responses to the user's messages. The responses may extend the attention points in accordance with the intentions. For example, based on the attention point "like Natto" and the intention "for healthy", the chatbot may further introduce topics about health life style, recommend healthy foods, etc.

In some cases, facts or emotions may be expressed in a dispersed, changeable or implicit way, and accordingly it is difficult to derive an attention point and an intention. An exemplary session may be: "User: Morning", "Chatbot: Good Morning. Nice breakfast?", "User: Yes", "Chatbot: What for today?", "User: Natto", "Chatbot: Oh, I thought you did not like it", "User: I was", "Chatbot: Changed for healthy?", "User: Yes, I heard the News about it", "Chatbot: Sounds good". In this session, the user actually does not explicitly express his opinions about whether he likes eating Natto or not.

Embodiments of the present disclosure propose to determine information about attention points and intentions through fact-based reasoning and emotion-based reasoning, and further generate responses based at least on the determined information.

In some embodiments, dynamic memory network (DMN) technique may be adopted for generating the responses. Fact memory vectors may be reasoned out by a DMN from fact vectors of a current session and candidate fact responses, wherein the candidate fact responses may refer to candidate responses determined at a fact basis. Moreover, emotion memory vectors may be reasoned out by a DMN from emotion vectors of the current session and candidate emotion responses, wherein the candidate emotion responses may refer to candidate responses determined at an emotion basis. The fact and emotion memory vectors may contain information about an attention point. An intention vector may be generated based on the fact and emotion memory vectors, which may contain information about both the attention point and an intention. A response to a current message may be generated based at least on the intention vector and the fact and emotion memory vectors.

In some embodiments, the emotion vectors may be generated by a sentiment analysis classifier. The sentiment analysis classifier may be used for performing sentiment analysis on input sequences.

In some embodiments, knowledge graphs may be used for determining the candidate fact responses and the candidate emotion responses. The knowledge graphs may comprise a type of knowledge graph representing topic-to-topic mapping relationship, and another type of knowledge graph representing topic-to-emotion or emotion-to-topic mapping relationship.

In some embodiments, a generative adversarial network (GAN) may be established, which may include a generator and a discriminator. The generator may be based on DMN for generating responses, and the discriminator may be based on a deep semantic similarity model (DSSM). The GAN may be used for refining or improving the generator.

FIG. 1 illustrates an exemplary application scenario 100 of a chatbot according to an embodiment.

In FIG. 1, a network 110 is applied for interconnecting among a terminal device 120 and a chatbot server 130.

The network 110 may be any type of networks capable of interconnecting network entities. The network 110 may be a single network or a combination of various networks. In terms of coverage range, the network 110 may be a Local Area Network (LAN), a Wide Area Network (WAN), etc. In terms of carrying medium, the network 110 may be a wireline network, a wireless network, etc. In terms of data switching techniques, the network 110 may be a circuit switching network, a packet switching network, etc.

The terminal device 120 may be any type of electronic computing devices capable of connecting to the network 110, assessing servers or websites on the network 110, processing data or signals, etc. For example, the terminal device 120 may be desktop computers, laptops, tablets, smart phones, etc. Although only one terminal device is shown in FIG. 1, it should be appreciated that a different number of terminal devices may connect to the network 110.

In an implementation, the terminal device 120 may be used by a user. The terminal device 120 may include a chatbot client 122 which may provide automated chatting service for the user. In some cases, the chatbot client 122 may interact with the chatbot server 130. For example, the chatbot client 122 may transmit messages input by the user to the chatbot server 130, and receive responses associated with the messages from the chatbot server 130. However, it should be appreciated that, in other cases, instead of interacting with the chatbot server 130, the chatbot client 122 may also locally generate responses to messages input by the user.

The chatbot server 130 may connect to or incorporate a chatbot database 132. The chatbot database 132 may comprise information that can be used by the chatbot server 130 for generating responses.

It should be appreciated that all the network entities shown in FIG. 1 are exemplary, and depending on specific application requirements, any other network entities may be involved in the application scenario 100.

Figure 2:
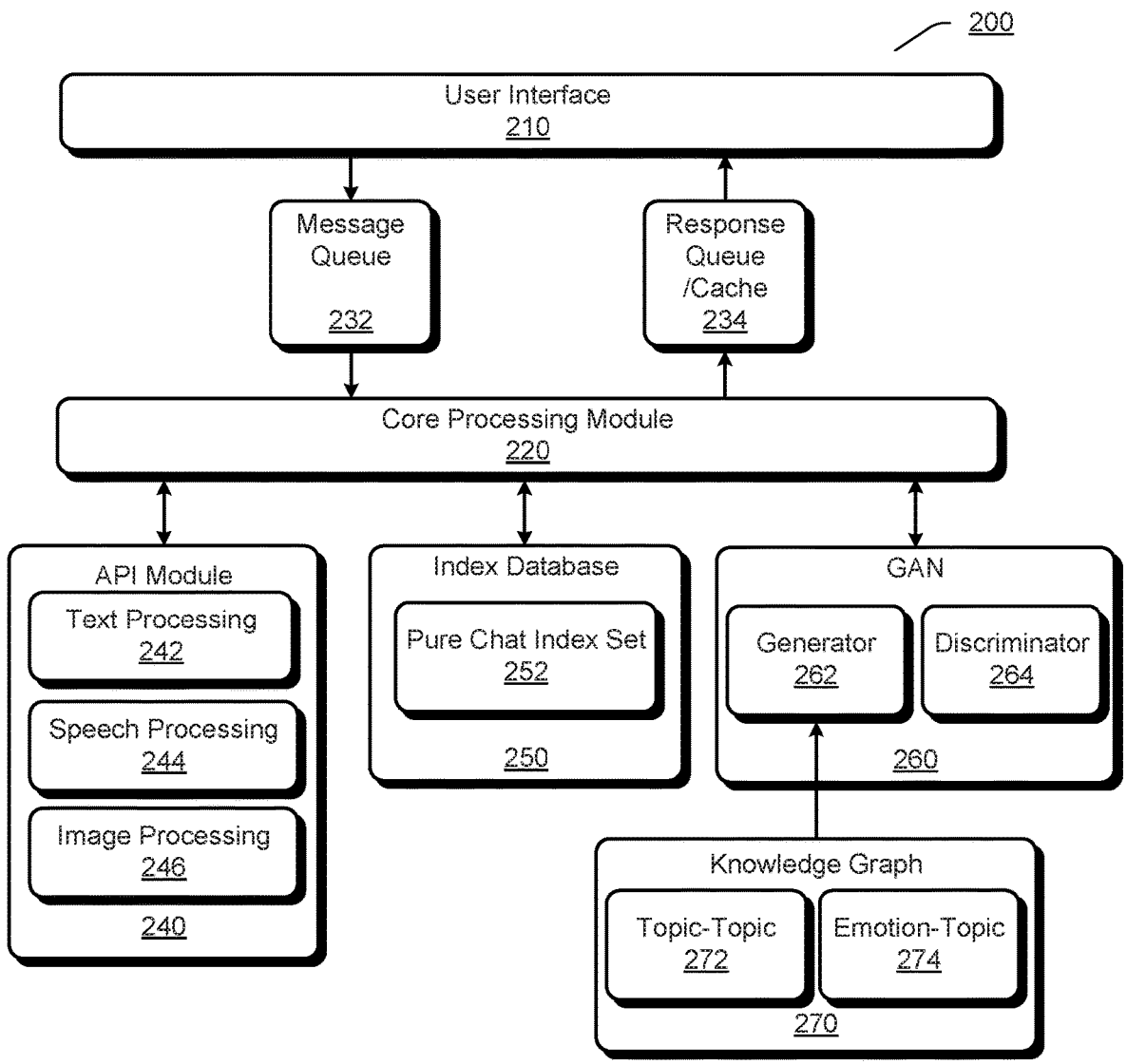
FIG. 2 illustrates an exemplary chatbot system according to an embodiment.

FIG. 2 illustrates an exemplary chatbot system 200 according to an embodiment.

The chatbot system 200 may comprise a user interface (UI) 210 for presenting a chat window. The chat window may be used by the chatbot for interacting with a user.

The chatbot system 200 may comprise a core processing module 220. The core processing module 220 is configured for, during operation of the chatbot, providing processing capabilities through cooperation with other modules of the chatbot system 200.

The core processing module 220 may obtain messages input by the user in the chat window, and store the messages in the message queue 232. The messages may be in various multimedia forms, such as, text, speech, image, video, etc.

The core processing module 220 may process the messages in the message queue 232 in a first-in-first-out manner. The core processing module 220 may invoke processing units in an application program interface (API) module 240 for processing various forms of messages. The API module 240 may comprise a text processing unit 242, a speech processing unit 244, an image processing unit 246, etc.

For a text message, the text processing unit 242 may perform text understanding on the text message, and the core processing module 220 may further determine a text response.

For a speech message, the speech processing unit 244 may perform a speech-to-text conversion on the speech message to obtain text sentences, the text processing unit 242 may perform text understanding on the obtained text sentences, and the core processing module 220 may further determine a text response. If it is determined to provide a response in speech, the speech processing unit 244 may perform a text-to-speech conversion on the text response to generate a corresponding speech response.

For an image message, the image processing unit 246 may perform image recognition on the image message to generate corresponding texts, and the core processing module 220 may further determine a text response. In some cases, the image processing unit 246 may also be used for obtaining an image response based on the text response.

Moreover, although not shown in FIG. 2, the API module 240 may also comprise any other processing units. For example, the API module 240 may comprise a video processing unit for cooperating with the core processing module 220 to process a video message and determine a response.

The core processing module 220 may determine responses through an index database 250. The index database 250 may comprise a plurality of index items that can be retrieved by the core processing module 220 as responses. The index items in the index database 250 may be classified into a pure chat index set 252. The pure chat index set 252 may comprise index items that are prepared for free chatting between the chatbot and users, and may be established with data from, e.g., social networks. The index items in the pure chat index set 252 may or may not be in a form of question-answer (QA) pair. Question-answer pair may also be referred to as message-response pair.

The chatbot system 200 may comprise a GAN 260. The GAN 260 may include a generator 262 and a discriminator 264. The generator 262 may be used for generating responses based on, e.g., DMN, and the discriminator 264 may be based on a DSSM. The generator 262 may take knowledge graph 270 as input. The knowledge graph 270 may comprise a topic-topic knowledge graph 272 and an emotion-topic knowledge graph 274. Herein, "topic-topic knowledge graph" may refer to a knowledge graph which represents topic-to-topic mapping relationship among a number of phrases and is established with a plurality of topic phrases, wherein the topic phrases may refer to phrases that indicate various topics. "Emotion-topic knowledge graph" may refer to a knowledge graph which represents topic-to-emotion mapping relationship and emotion-to-topic mapping relationship among a number of phrases and is established with a plurality of topic phrases and a plurality of emotion phrases, wherein the emotion phrases may refer to phrases that indicate various emotions. The "emotion-topic knowledge graph" may also be referred to as "emotion-oriented topic graph". It should be appreciated that, in this disclosure, the term "word" may be interchangeable with the term "phrase", e.g., "a word" may be a single word or a combination of several words, and "a phrase" may comprise a single word or a combination of several words.

The responses determined by the core processing module 220 may be provided to a response queue or response cache 234. For example, the response cache 234 may ensure that a sequence of responses can be displayed in a pre-defined time stream. Assuming that, for a message, there are no less than two responses determined by the core processing module 220, then a time-delay setting for the responses may be necessary. For example, if a message input by the user is "Did you eat your breakfast?", two responses may be determined, such as, a first response "Yes, I ate bread" and a second response "How about you? Still feeling hungry?". In this case, through the response cache 234, the chatbot may ensure that the first response is provided to the user immediately. Further, the chatbot may ensure that the second response is provided in a time delay, such as 1 or 2 seconds, so that the second response will be provided to the user 1 or 2 seconds after the first response. As such, the response cache 234 may manage the to-be-sent responses and appropriate timing for each response.

The responses in the response queue or response cache 234 may be further transferred to the UI 210 such that the responses can be displayed to the user in the chat window.

It should be appreciated that all the elements shown in the chatbot system 200 in FIG. 2 are exemplary, and depending on specific application requirements, any shown elements may be omitted and any other elements may be involved in the chatbot system 200.

Figure 3:
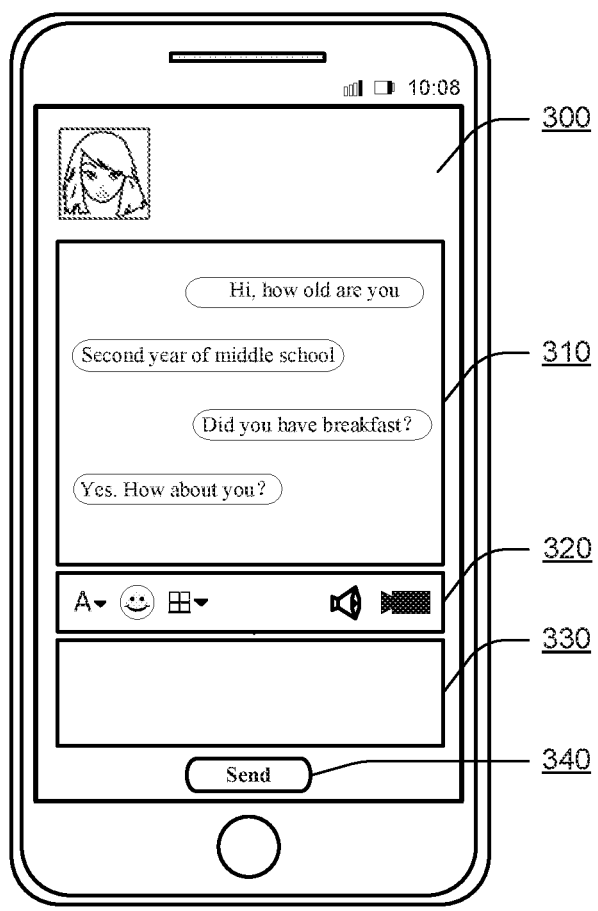
FIG. 3 illustrates an exemplary user interface according to an embodiment.

FIG. 3 illustrates an exemplary user interface 300 according to an embodiment.

The user interface 300 is included in a terminal device, and may comprise a presentation area 310, a control area 320 and an input area 330. The presentation area 310 displays messages and responses in a chat flow. The control area 320 includes a plurality of virtual buttons for the user to perform message input settings. For example, the user may select to make a voice input, attach image files, select emoji symbols, make a short-cut of the current screen, etc. through the control area 320. The input area 330 is used by the user for inputting messages. For example, the user may type text through the input area 330. The user interface 300 may further comprise a virtual button 340 for confirming to send input messages. If the user touches the virtual button 340, the messages input in the input area 330 may be sent to the presentation area 310.

It should be noted that all the elements and their layout shown in FIG. 3 are exemplary. Depending on specific application requirements, the user interface in FIG. 3 may omit or add any elements, and the layout of the elements in the user interface in FIG. 3 may also be changed in various approaches.

As discussed above, the embodiments of the present disclosure may adopt a sentiment analysis classifier for performing sentiment analysis. Conventional sentiment analysis can only classify input content into a limited number of emotions, such as, positive emotion, negative emotion and neural emotion. While the sentiment analysis classifier according to the embodiments of the present disclosure may perform a fine-grained sentiment analysis which can classify input content into a greater number of emotions.

In an implementation, the sentiment analysis classifier may discriminate 8 types of emotions, including happy, angry, fearful, contemptuous, sad, surprise, disgusted and neutral. It should be appreciated that although the following discussion is related to the sentiment analysis classifier with 8 types of emotions, the embodiments of the present disclosure are not limited to 8 types of emotions. Instead, sentiment analysis classifiers with any other number of emotion types may be obtained under the concept of the present disclosure.

An exemplary sentence with the emotion "happy" may be "I'm so glad to hear that!". An exemplary sentence with the emotion "angry" may be "How dare you ignore that!". An exemplary sentence with the emotion "fearful" may be "It's a terrible accident". An exemplary sentence with the emotion "contemptuous" may be "Only a computer cannot be that swagger". An exemplary sentence with the emotion "sad" may be "I don't like it and want to cry". An exemplary sentence with the emotion "surprise" may be "What? Really?". An exemplary sentence with the emotion "disgusted" may be "He is more stupid than I expected". An exemplary sentence with the emotion "neutral" may be "Tomorrow's schedule is determined".

Figure 4:
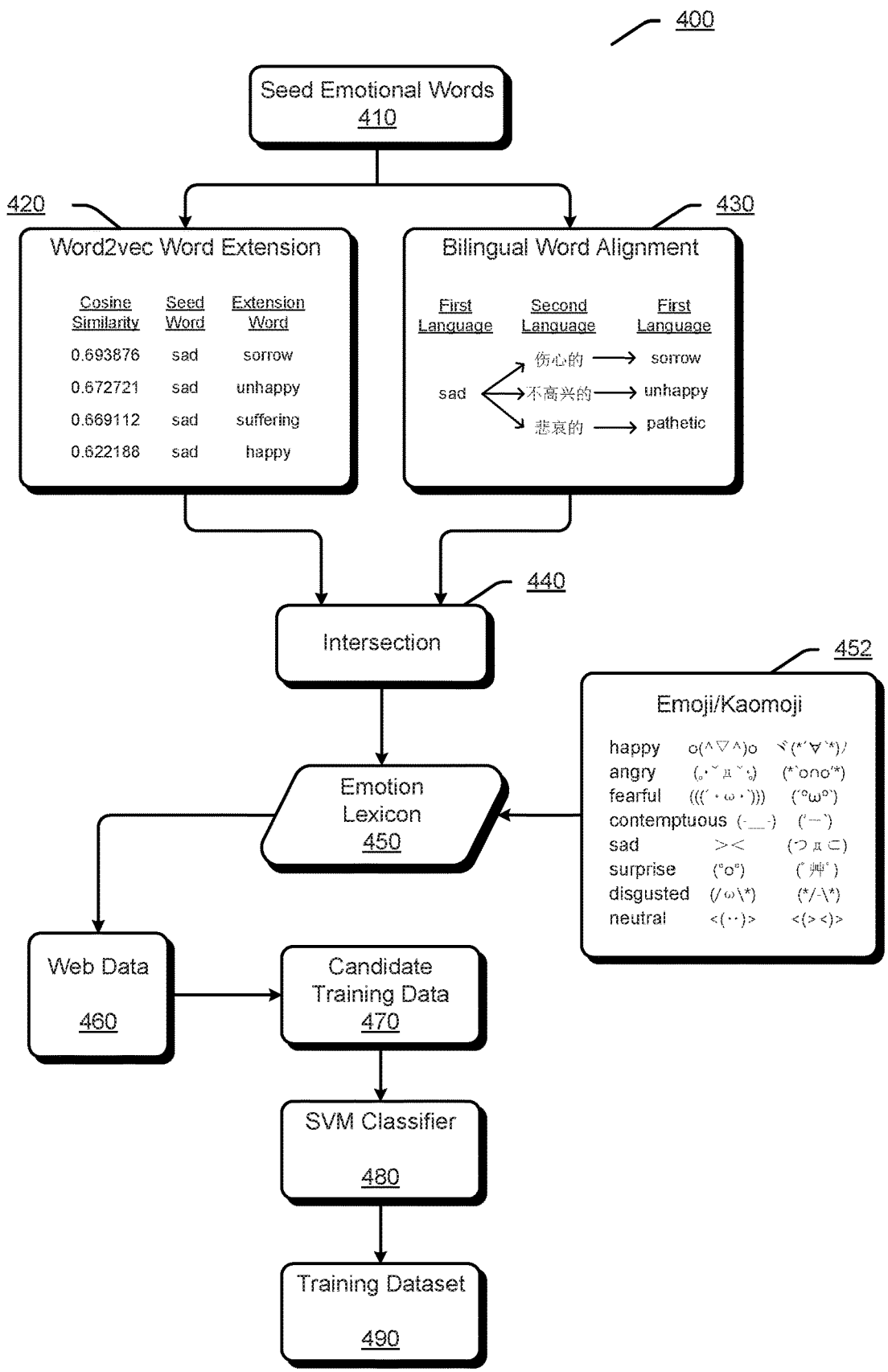
FIG. 4 illustrates an exemplary process for obtaining training dataset for a sentiment analysis classifier according to an embodiment.

FIG. 4 illustrates an exemplary process 400 for obtaining training dataset for a sentiment analysis classifier according to an embodiment. The process 400 may be performed for generating an emotion lexicon by extending seed emotional words, and further determining a training dataset based on the emotion lexicon.

At 410, seed emotional words may be obtained. Herein, the seed emotional words may include emotional words corresponding to each type of emotion. Taking the emotion "happy" as an example, the seed emotional words may include a plurality of words corresponding to the emotion "happy", such as, "happy", "pleased", "glad", "blessed", etc. The seed emotional words may be obtained from existing manually-constructed sentiment lexicons that contain words with manually-labeled emotional polarities. These manually-constructed sentiment lexicons can only provide a limited number of seed emotional words that are not enough for obtaining a training dataset for the sentiment analysis classifier.

At 420, a Word2vec word extension may be performed based on the seed emotional words so as to extend the seed emotional words. A Word2vec cosine similarity score for each seed emotional word and a word from a corpus may be computed. In this way, a number of words, from the corpus, with computed cores may be collected for each emotional word, and then a plurality of top-ranked words may be determined as extension to the seed emotional word. For example, as shown in FIG. 4, for the seed emotional word "sad", extension words "sorrow", "unhappy", "suffering", "happy", etc. may be determined based on the computed Word2vec cosine similarity scores.

It should be appreciated that Word2vec cosine similarity score is computed based on, such as, positions of words in sentences. Thus, the Word2vec word extension cannot ensure that all the extension words have a similar semantic meaning with the corresponding seed emotional word. For example, in FIG. 4, "happy" is determined as an extension word to the seed emotional word "sad", however, these two words have different semantic meanings. Thus, the process 400 further comprises a pruning mechanism, which is based on bilingual word alignment, for removing those extension words having different semantic meanings or weak semantic relevance from corresponding seed emotional words.

At 430, bilingual word alignment may be performed. The bilingual word alignment may be used for finding semantically relevant words to a seed word through a round-trip translating between two different languages. A seed emotional word in a first language may be translated into words in a second language. For example, the seed emotional word "sad" in English may be translated into words "伤", 心的" 不高兴的" and "悲哀的" in Chinese. Then, the words in the second language may be translated back into words in the first language. For example, the words "伤心", 的"不高兴的" and "悲哀的" in Chinese may be translated back into words "sorrow", "unhappy" and "pathetic" in English respectively. Thus, a list of words "sorrow", "unhappy" and "pathetic" may be obtained through the bilingual word alignment for the seed emotional word "sad".

At 440, an intersection operation may be performed on the extension words obtained by the Word2vec word extension at 420 and the word list obtained by the bilingual word alignment at 430. The intersection operation may be used for removing those extension words, obtained by the Word2vec word extension, having different semantic meanings or weak semantic relevance from corresponding seed emotional words. For example, in FIG. 4, through the intersection operation, the words "sorrow" and "unhappy" may be retained, while the word "suffering" having weak semantic relevance from "sad" and the word "happy" having different semantic meanings from "sad" are removed.

The retained words through the intersection operation may be appended to an emotion lexicon 450. In an implementation, words in the emotion lexicon 450 may be further added by corresponding emoticons, e.g., emoji or kaomoji. At 452, emoji or kaomoji may be collected from the network for each type of emotions. For example, for the emotion "sad", its corresponding emoticons may include, such as, "><", "(つ д ⊂)", etc. Accordingly, these emoticons may be appended to the words "sad", "sorrow" and "unhappy" corresponding to the emotion "sad" in the emotion lexicon 450.

As discussed above, the emotion lexicon 450 is established by performing Word2vec word extension and bilingual word alignment on seed emotional words, and may include much more words than the manually-constructed sentiment lexicons. The emotion lexicon 450 may be used for finding sentences, from web data 460, that contain at least one word in the emotion lexicon 450. Each of the sentences may be labeled by an emotion of a corresponding word in the emotion lexicon 450 that this sentence contains. These sentences together with corresponding emotional labels may be used as candidate training data 470.

In some cases, the candidate training data 470 may comprise some interference sentences that have obscure emotions or are difficult to identify emotions. An exemplary interference sentence may comprise a word "not" or its equivalents, which may switch from an original emotion to a contrary emotion. Another exemplary interference sentence may comprise both positive words and negative words in a mixture way, such as, "praise first and then criticize". A support vector machine (SVM) classifier 480 may be used for filtering out interference sentences from the candidate training data 470. The SVM classifier 480 may use trigram characters as features. A set of classifier training data may be obtained for training the SVM classifier 480. Regarding emotions except "neutral", instances may be manually labeled for each type of emotion and then used as classifier training data, and regarding the emotion "neutral", sentences that do not contain emotional words or emoji/kaomoji may be collected from the network as classifier training data.

Through the classifier training data, the SVM classifier 480 may be trained for discriminating interference sentences from other sentences in the candidate training data 470. After filtering out the interference sentences, the remaining sentences in the candidate training data 470 may form a training dataset 490 for training the sentiment analysis classifier.

It should be appreciated that the operations by the SVM classifier 480 are optional in the process 400. Thus, in an implementation, the operations by the SVM classifier 480 may also be omitted from the process 400, and accordingly the candidate training data 470 may form the training dataset 490 directly.

Figure 5:
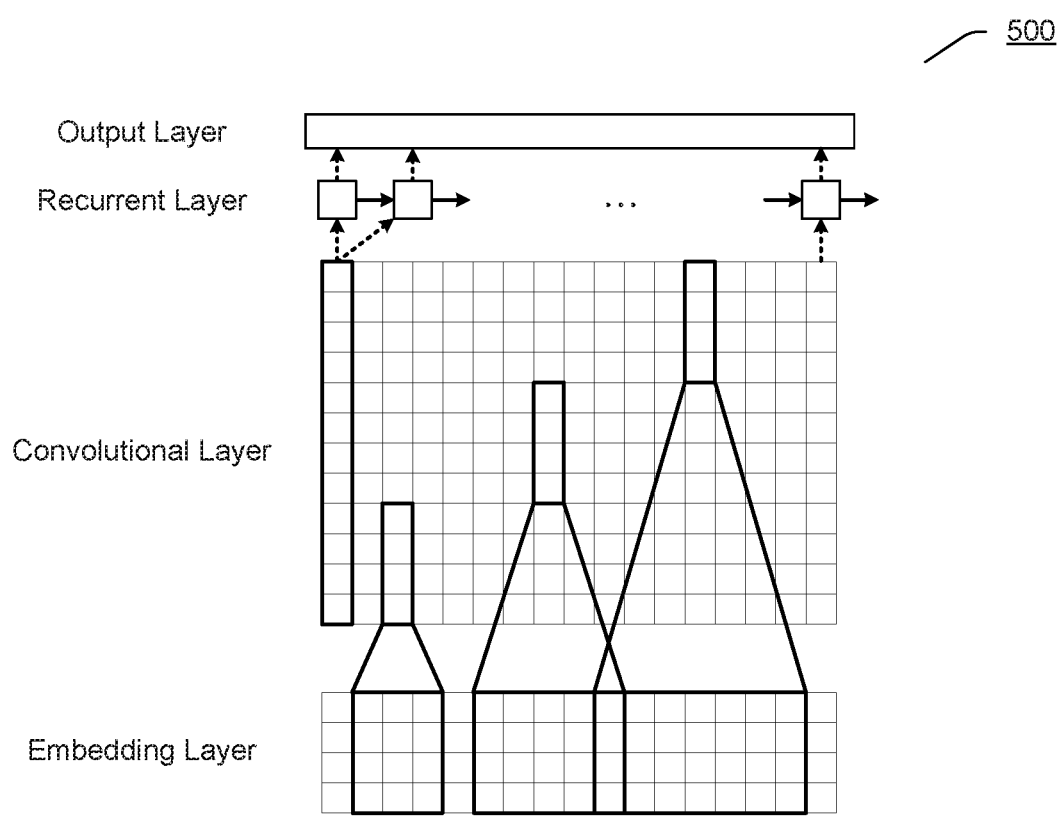
FIG. 5 illustrates an exemplary sentiment analysis classifier according to an embodiment.

FIG. 5 illustrates an exemplary sentiment analysis classifier 500 according to an embodiment, which may be trained by the training dataset obtained in FIG. 4. The sentiment analysis classifier 500 may be based on a character-level recurrent convolutional neural network (RCNN). The character-level RCNN is capable of encoding both semantic and orthographic information from characters. The character-level RCNN may comprise an embedding layer, a convolutional layer, a recurrent layer and an output layer. It should be appreciated that, as for sentences in a character-style language, e.g., Japanese, Chinese, etc., characters in the sentences may be taken as basic units for embedding, while as for sentences in a word-style language, e.g., English, words in the sentences, instead of letters, may be taken as basic units for embedding. When the basic units in the embedding layer are "characters", the convolutional layer is to find the best combinations of words each of which is combined by several characters. When the basic units in the embedding layer are "words", the convolutional layer is to find the best combinations of phrases each of which is combined by several words. Although the following discussion aims at the case of "character", similar technical means may also be applied for the case of "word".

The embedding layer may convert a sentence into dense vector space, e.g., generating an emotion vector for each character in the sentence.

The convolutional layer may be based on a CNN, and may perform convolution operations on the emotion vectors from the embedding layer, e.g., converting the emotion vectors with various kernel sizes.

Let $Q \in \mathbb{R}^{d*|V|}$ be a character embedding matrix with d being the dimensionality of character embedding and V being a character vocabulary set. It is assumed that a word $w=c_1, \ldots, C_l$, which has l characters $c_j$. Then, a character-level representation of w is given by a matrix $C^w \in \mathbb{R}^{d*l}$, where the j-th column of $C^w$ corresponds to a character embedding for $c_j$ which is further the j-th column of Q. A narrow convolution is applied between $C^w$ and a filter or convolutional function $H \in \mathbb{R}^{d*f}$ with a width f. FIG. 5 shows three exemplary filters with widths f=3, 5 and 7. Then, a bias is added, and a nonlinearity transformation is applied to obtain a feature map $f^w \in \mathbb{R}^{l-f+1}$. The i-th element of r may be given as:

$$f^w[i]=\tanh(<C^w[*,i:i+f-1],H>+b) \quad \text{Equation (1)}$$

where $C^w[*,i:i+f-1]$ is the i-to-(i+f−1)-th columns of $C^w$, and $<A, B>=\text{Tr}(AB^T)$ is a Frobenius inner product.

In an implementation, the CNN at the convolutional layer may adopt, such as, a max pooling over time.

The recurrent layer may perform recurrent operations on outputs of the convolutional layer. It should be appreciated that, although FIG. 5 shows unidirectional recurrent operations in the recurrent layer, bidirectional recurrent operations may also be applied in the recurrent layer. The recurrent layer may also be referred to as a RNN layer, which may adopt long-short term memory (LSTM) units. The LSTM may address a learning problem of long distance dependencies and a gradient vanishing problem, through augmenting a traditional RNN with a memory cell vector $c_t \in \mathbb{R}^n$ at each time step. One step of the LSTM takes $x_t$, $h_{t-1}$, $c_{t-1}$ as inputs and produces $h_t$, $c_t$ via the following intermediate calculations:

$$i_t = \sigma(W^i x_t + U^i h_{t-1} + b^i) \quad \text{Equation (2)}$$

$$f_t = \sigma(W^f x_t + U^f h_{t-1} + b^f) \quad \text{Equation (3)}$$

$$o_t = \sigma(W^o x_t + U^o h_{t-1} + b^o) \quad \text{Equation (4)}$$

$$g_t = \tanh(W^g x_t + U^g h_{t-1} + b^g) \quad \text{Equation (5)}$$

$$c_t = f_t \otimes c_{t-1} + i_t \otimes g_t \quad \text{Equation (6)}$$

$$h_t = o_t \otimes \tanh(c_t) \quad \text{Equation (7)}$$

where $\sigma(.)$ and $\tanh(.)$ are elementwise sigmoid and hyperbolic tangent functions, $\otimes$ is an elementwise multiplication operator, and $i_t$, $f_t$, $o_t$ denote input gate, forget gate and output gate respectively. When t=1, $h_0$ and $c_0$ are initialized to be zero vectors. Parameters to be trained in the LSTM are the matrices $W^j$, $U^j$, and the bias vector $b^j$, where $j \in \{i, f, o, g\}$.

The output layer may use RNN states from the recurrent layer as feature vectors, and output emotion classification results. For example, the output layer may be a full connection layer that can convert a 256-dimension vector from the recurrent layer to an output of 8-dimension vector which corresponds to 8 types of emotions.

Figure 6:
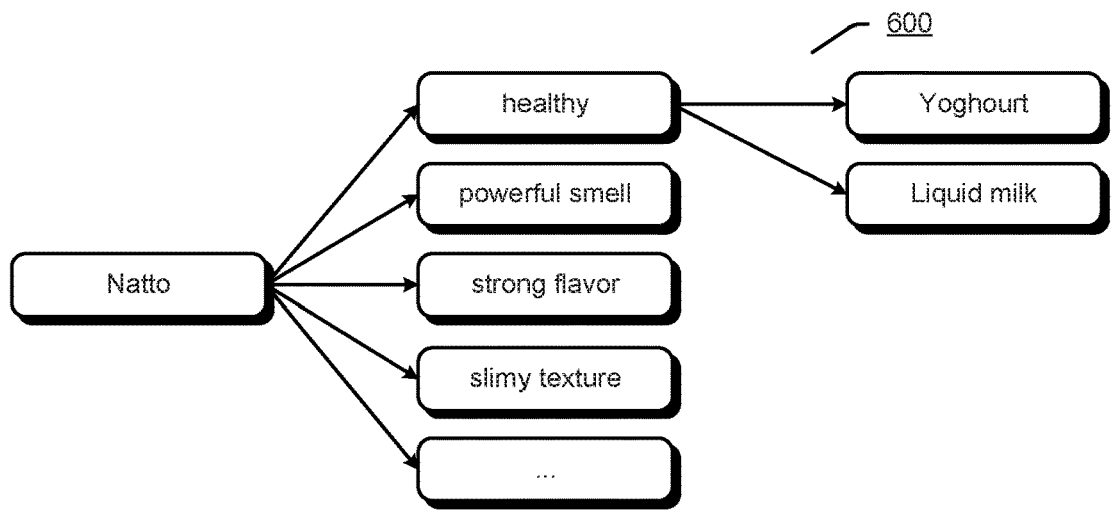
FIG. 6 illustrates an exemplary emotion-topic knowledge graph according to an embodiment.

FIG. 6 illustrates an exemplary emotion-topic knowledge graph 600 according to an embodiment. As mentioned above, an emotion-topic knowledge graph may comprise a plurality of phrases that have topic-to-emotion mapping relationship or emotion-to-topic mapping relationship among each other. The emotion-topic knowledge graph may intend to extend from a topic to related emotions, extend from the related emotions to further topics, and so on.

The emotion-topic knowledge graph 600 is established through extension from a topic phrase "Natto". For example, as for the topic "Natto", there may be various related emotions, e.g., "healthy", "powerful smell", "strong flavor", "slimy texture", etc. Taking the emotion phrase "healthy" as an example, there may be various related topics, e.g., "Yoghourt", "Liquid milk", etc.

Figure 7:
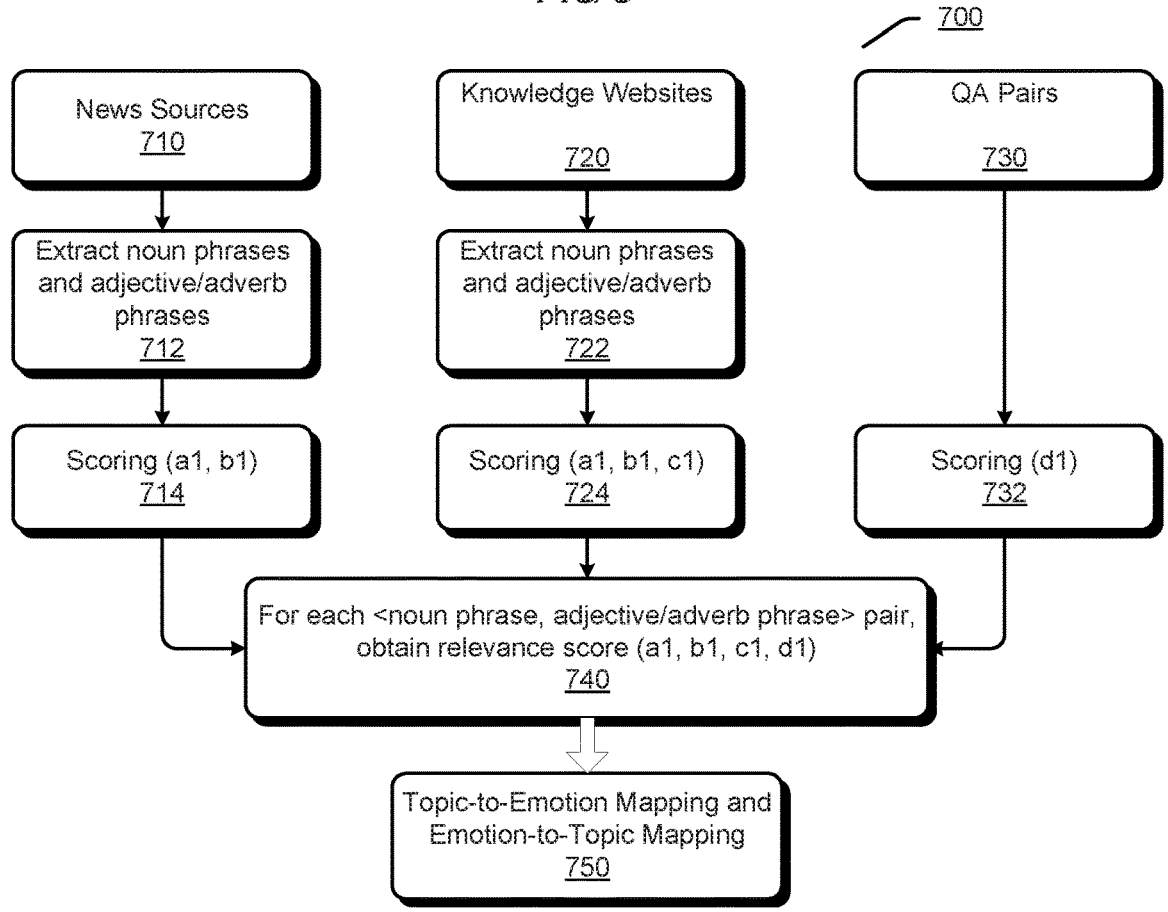
FIG. 7 illustrates an exemplary process for establishing an emotion-topic knowledge graph according to an embodiment.

FIG. 7 illustrates an exemplary process 700 for establishing an emotion-topic knowledge graph according to an embodiment. The process 700 may be used for determining phrase pairs that have topic-to-emotion mappings or emotion-to-topic mappings in the emotion-topic knowledge graph. Topic-to-emotion mappings and emotion-to-topic mappings may be established from various sources through data mining. Usually, a phrase pair having a topic-to-emotion mapping or emotion-to-topic mapping may comprise a noun phrase and an adjective or adverb phrase.

In an implementation, the data mining may be performed on news sources 710. The news sources 710 may comprise websites or channels that provide news contents.

At 712, noun phrases, adjective phrases and adverb phrases may be extracted from sentences in news contents provided by the news sources 710. Herein, the adjective phrases and the adverb phrases may refer to adjective or adverb words, or phrases including adjective or adverb words.

Figure 8:
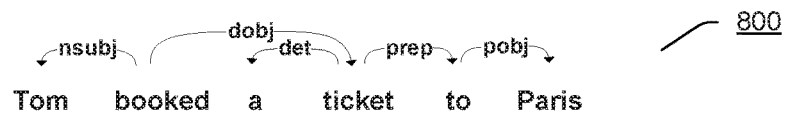
FIG. 8 illustrates an exemplary dependency parsing according to an embodiment.

At 714, phrase pairs formed by the noun phrases and the adjective/adverb phrases, e.g., <noun phrase, adjective/adverb phrase> pairs, may be scored based on dependency parsing. FIG. 8 illustrates an exemplary dependency parsing 800 on an exemplary sentence according to an embodiment. Assuming that a sentence "Tom booked a ticket to Paris" is input to the dependency parsing. The word "booked" is determined as a predicate of the sentence. A dependency arc from "booked" to "Tom" is determined, and the dependency role between "Tom" and "booked" is determined as "nsubj", where "nsubj" denotes nominal subject. A dependency arc from "booked" to "ticket" is determined, and the dependency role between "ticket" and "booked" is determined as "dobj", where "dobj" denotes direct subject. A dependency arc from "ticket" to "a" is determined, and the dependency role between "a" and "ticket" is determined as "det", where "det" denotes determiner. A dependency arc from "ticket" to "to" is determined, and the dependency role between "to" and "ticket" is determined as "prep", where "prep" denotes preposition. A dependency arc from "to" to "Paris" is determined, and the dependency role between "Paris" and "to" is determined as "pobj", where "pobj" denotes object of preposition. It should be appreciated that the dependency arcs and dependency roles shown in FIG. 8 are exemplary, and for other sentences, various dependency arcs and dependency roles may be determined through the dependency parsing.

Through the dependency parsing, dependency arcs and dependency roles among phrases of a sentence may be obtained. A phrase pair may be scored "a1" if there is a dependency arc between two phrases in the phrase pair, while the phrase pair may be scored "b1" if the two phrases in the phrase pair only appear in the same sentence, but there is no dependency arc between these two phrases.

In an implementation, the data mining may be performed on knowledge websites 720 on the network, e.g., Wikipedia. Usually, the knowledge websites 720 may present information in a form of Title and Content. An exemplary page in the knowledge websites 720 may be: "Title=Japanese foods", and "Content=Natto has a powerful smell".

At 722, noun phrases, adjective phrases and adverb phrases may be extracted from pages in the knowledge websites 720. For example, as for the above exemplary page, the noun phrase "Japanese foods", "Natto", "smell", and the adjective phrase "powerful" and "powerful smell" may be extracted.

At 724, phrase pairs formed by the noun phrases and the adjective/adverb phrases may be scored. In an implementation, all phrase pairs formed by noun phrases in the Title and adjective/adverb phrases in the Content may be scored "c1". For example, the phrase pair <Japanese foods, powerful> may be scored "c1", and the phrase pair <Japanese foods, powerful smell> may also be scored "c1". Moreover, the scoring mechanism of "a1" and "b1" at 714 may also be applied at 724. For example, the phrase pair <smell, powerful> may be scored "a1", the phrase pair <Natto, powerful smell> may also be scored "a1", etc.

In an implementation, the data mining may be performed on question-answer (QA) pairs 730 that may be from QA-style websites, or from a pure chat index set used by the chatbot for free chatting.

At 732, for each QA pair, word alignment scores "d1" may be computed for phrase pairs formed by noun phrases in a question of the QA pair and adjective/adverb phrases in an answer of the QA pair, or formed by adjective/adverb phrases in a question of the QA pair and noun phrases in an answer of the QA pair. The major idea of the computing of word alignment scores is to determine co-occurrence frequency of two phrases in sentence pairs in the whole corpus. Furthermore, if it is already known that two phrases should be aligned with each other in a sentence pair, either of these two phrases should not be aligned with any other phrases in the sentence pair, thus strengthening scores of related phrases and weakening scores of non-related phrases. In an implementation, IBM models 1-5 may be adopted at 732 for computing the word alignment scores.

It should be appreciated that although the word alignment scoring at 732 is discussed above as being performed on QA pairs, this word alignment scoring may also be performed in a similar way on sentence pairs, e.g., <current sentence, next sentence>, in a document.

At 740, a relevance score may be obtained for each <noun phrase, adjective/adverb phrase> pair based on the scoring at 714, 724 and 732. For example, for a phrase pair, a sum or a weight sum of corresponding scores obtained at 714, 724 and 732 may be used as the relevance score for the phrase pair.

At 750, topic-to-emotion mappings or emotion-to-topic mappings in the emotion-topic knowledge graph may be established based on the relevance scores obtained at 740. For example, for a noun phrase, one or more adjective/adverb phrases having the top-ranked relevance scores with the noun phrase may be added into the emotion-topic knowledge graph, and thus topic-to-emotion mappings from the noun phrase to these adjective/adverb phrases may be included in the emotion-topic knowledge graph. Moreover, for example, for an adjective/adverb phrase, one or more noun phrases having the top-ranked relevance scores with the adjective/adverb phrase may be added into the emotion-topic knowledge graph, and thus emotion-to-topic mappings from the adjective/adverb phrase to these noun phrases may be included in the emotion-topic knowledge graph. In this way, one or more further stages of topic-to-emotion mappings and emotion-to-topic mappings may be included in the emotion-topic knowledge graph.

Figure 9:
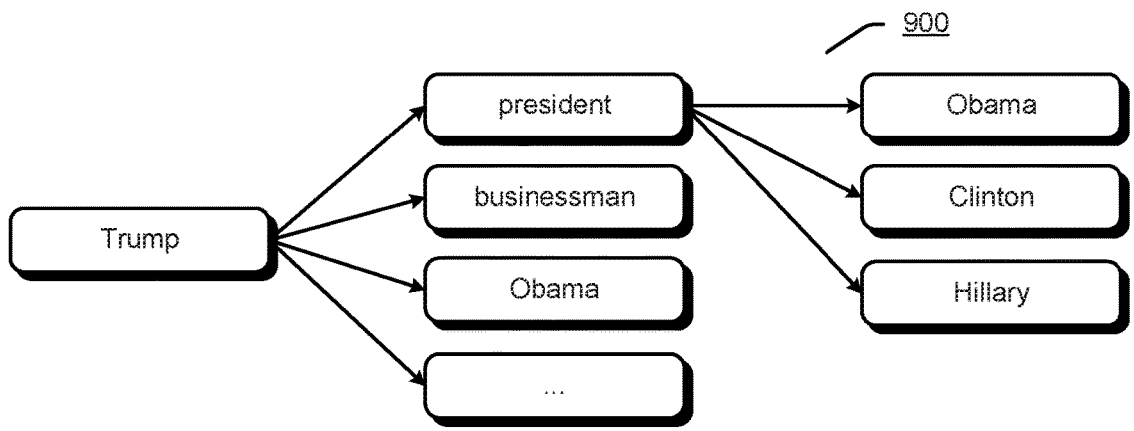
FIG. 9 illustrates an exemplary topic-topic knowledge graph according to an embodiment.

FIG. 9 illustrates an exemplary topic-topic knowledge graph 900 according to an embodiment. As mentioned above, a topic-topic knowledge graph may comprise a plurality of phrases that have topic-to-topic mapping relationship among each other. The topic-topic knowledge graph may intend to extend from a topic to related topics, extend from the related topics to further topics, and so on.

The topic-topic knowledge graph 900 is established through extension from a topic phrase "Trump". For example, as for the topic "Trump", there may be various related topics, e.g., "president", "businessman", "Obama", etc. Taking the topic phrase "president" as an example, there may be various related topics, e.g., "Obama", "Clinton", "Hillary", etc.

Figure 10:
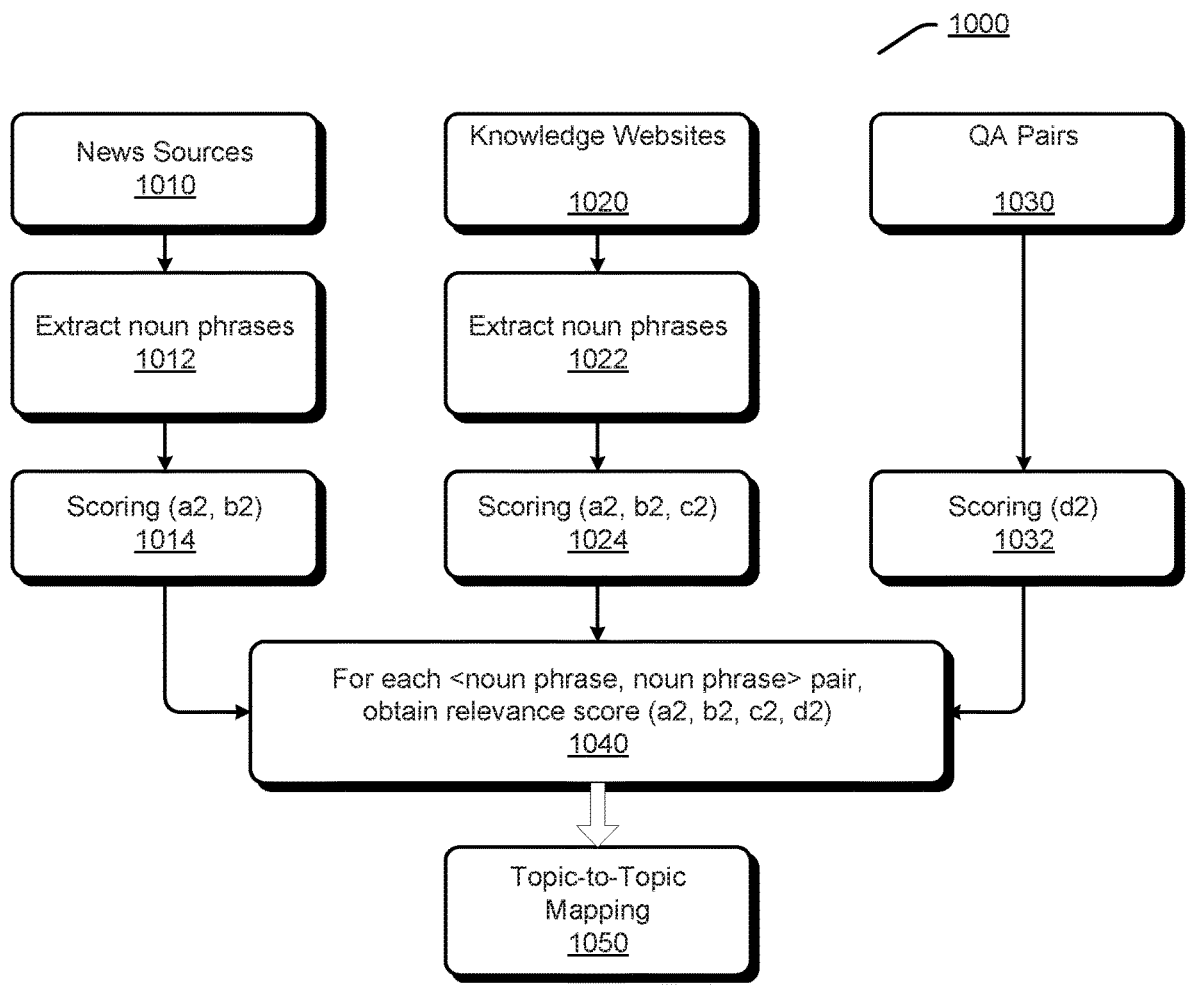
FIG. 10 illustrates an exemplary process for establishing a topic-topic knowledge graph according to an embodiment.

FIG. 10 illustrates an exemplary process 1000 for establishing a topic-topic knowledge graph according to an embodiment. The process 1000 may be used for determining phrase pairs that have topic-to-topic mappings in the topic-topic knowledge graph. Topic-to-topic mappings may be established from various sources through data mining. Usually, a phrase pair having a topic-to-topic mapping may comprise two noun phrases.

In an implementation, the data mining may be performed on news sources 1010.

At 1012, noun phrases may be extracted from sentences in the news sources 1010.

At 1014, phrase pairs formed by the noun phrases, e.g., <noun phrase, noun phrase> pairs, may be scored based on dependency parsing. A phrase pair may be scored "a2" if there is a dependency arc between two phrases in the phrase pair, while the phrase pair may be scored "b2" if the two phrases in the phrase pair only appear in the same sentence, but there is no dependency arc between these two phrases.

In an implementation, the data mining may be performed on knowledge websites 1020 on the network, e.g., Wikipedia. An exemplary page in the knowledge websites 1020 may be: "Title=Japanese foods", and "Content=Natto has a powerful smell".

At 1022, noun phrases may be extracted from pages in the knowledge websites 1020. For example, as for the above exemplary page, the noun phrases "Japanese foods", "Natto", and "smell" may be extracted.

At 1024, phrase pairs formed by the noun phrases may be scored. In an implementation, all phrase pairs formed by noun phrases in the Title and noun phrases in the Content may be scored "c2". For example, the phrase pair <Japanese foods, Natto> may be scored "c2". Moreover, the scoring mechanism of "a2" and "b2" at 1014 may also be applied at 1024. For example, the phrase pair <Natto, smell> may be scored "a2", etc.

In an implementation, the data mining may be performed on QA pairs 1030 that may be from QA-style websites, or from a pure chat index set used by the chatbot for free chatting.

At 1032, for each QA pair, phrase alignment scores "d2" may be computed for phrase pairs formed by noun phrases in a question of the QA pair and noun phrases in an answer of the QA pair. In an implementation, IBM models 1-5 may be adopted at 1032 for computing the phrase alignment scores.

It should be appreciated that although the phrase alignment scoring at 1032 is discussed above as being performed on QA pairs, this phrase alignment scoring may also be performed in a similar way on sentence pairs, e.g., <current sentence, next sentence>, in a document.

Moreover, it should be appreciated that although the phrase alignment scoring at 732 in FIG. 7 and the phrase alignment scoring at 1032 in FIG. 10 are discussed separately, these two phrase alignment scoring operations may also be performed jointly. For example, phrase alignment scoring may be performed on any phrase pairs firstly, irrespective of whether these phrases are noun phrases or adjective/adverb phrases, then phrase alignment scores of phrase pairs formed by noun phrases and adjective/adverb phrases may be provided to the process 700 in FIG. 7, and phrase alignment scores of phrase pairs formed by noun phrases may be provided to the process 1000 in FIG. 10 respectively.

At 1040, a relevance score may be obtained for each <noun phrase, noun phrase> pair based on the scoring at 1014, 1024 and 1032. For example, for a phrase pair, a sum or a weight sum of corresponding scores obtained at 1014, 1024 and 1032 may be used as the relevance score for the phrase pair.

At 1050, topic-to-topic mappings in the topic-topic knowledge graph may be established based on the relevance scores obtained at 1040. For example, for a target noun phrase, one or more noun phrases having the top-ranked relevance scores with the target noun phrase may be added into the topic-topic knowledge graph, and thus topic-to-topic mappings from the target noun phrase to the one or more noun phrases may be included in the topic-topic knowledge graph. In this way, one or more further stages of topic-to-topic mappings may be included in the topic-topic knowledge graph.

As mentioned above, the process 700 in FIG. 7 may be used for determining topic-to-emotion mappings and emotion-to-topic mappings and forming an emotion-topic knowledge graph, and the process 1000 in FIG. 10 may be used for determining topic-to-topic mappings and forming a topic-topic knowledge graph. The emotion-topic knowledge graph and the topic-topic knowledge graph may also be collectively called as knowledge graph.

Figure 11:
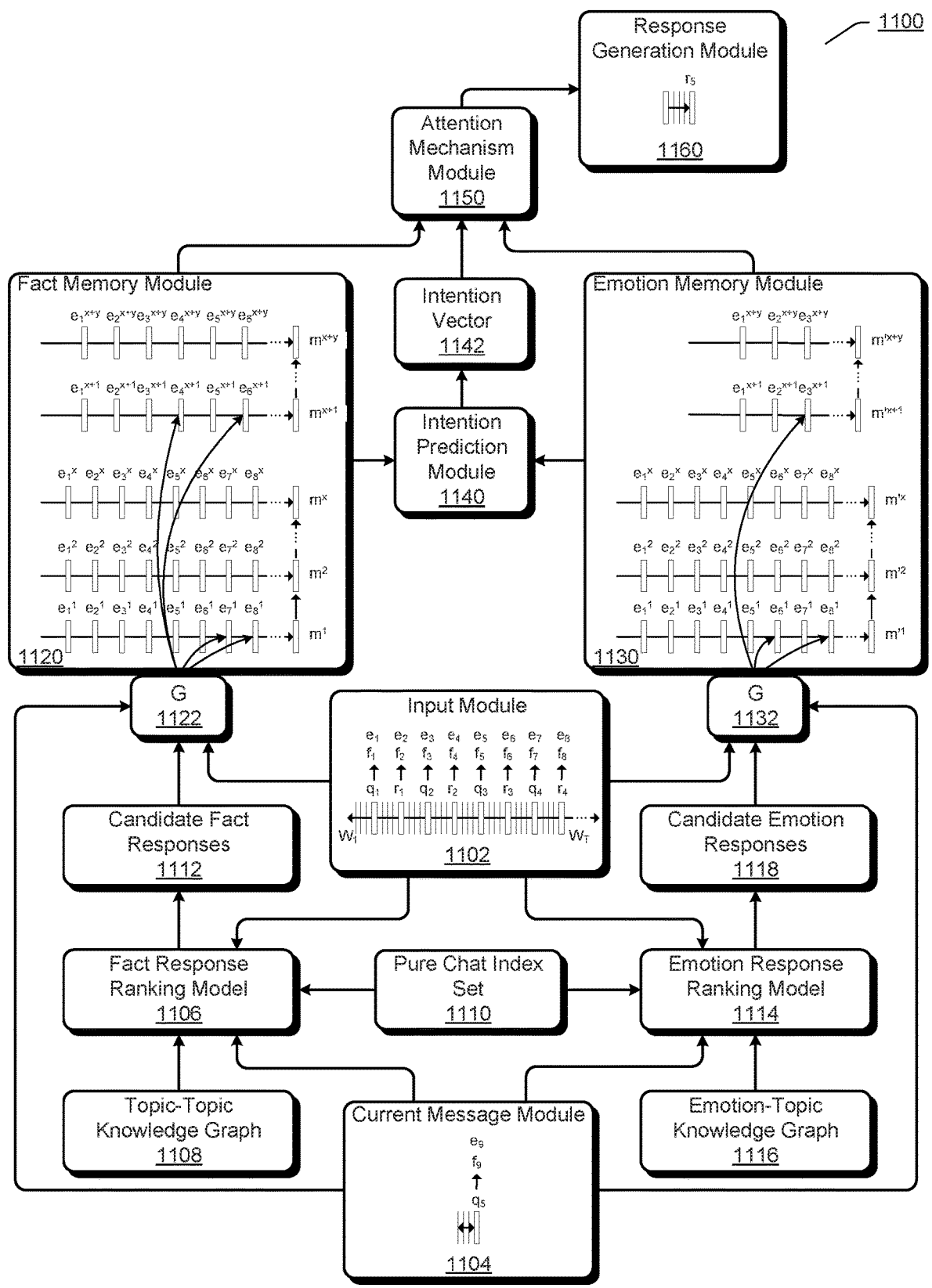
FIG. 11 illustrates an exemplary framework for generating responses through Dynamic Memory Network (DMN) according to an embodiment.

FIG. 11 illustrates an exemplary framework 1100 for generating responses through DMN according to an embodiment. The framework 1100 may reason out fact memory vectors and emotion memory vectors through DMN, obtain an intention vector based on the fact and emotion memory vectors, and further generate a response to a current message based at least on the attention vector and the fact and emotion memory vectors.

The framework 1100 may comprise an input module 1102. At the input module 1102, a current session, as context information, may be processed. For example, a sequence of sentences $q_1$ to $q_4$ and $r_1$ to $r_4$ in the current session may be provided to the input module 1102, wherein $q_1$ to $q_4$ are messages from the user in current session, and $r_1$ to $r_4$ are responses by the chatbot to the messages $q_1$ to $q_4$ in the current session. Each sentence is ended with "</s>" to denote the ending of one sentence. All the eight sentences may be concatenated together to form an input sequence having T words, from $W_1$ to $W_T$. A bidirectional gated recurrent unit (GRU) encoding may be applied on the input sequence. For the left-to-right direction or the right-to-left direction, at each time step t, hidden state may be updated as $h_t$=GRU(L[$w_t$], $h_{t-1}$), where L is an embedding matrix, and $w_t$ is a word or character index of the t-th word or character in the input sequence. Thus, a resulting representation vector for a sentence is a combination of two vectors and each vector is from one direction. Internal mechanism of the GRU is as follows:

$$z_t=\sigma(W^{(z)}x_t+U^{(z)}h_{t-1}+b^{(z)})  \quad \text{Equation (8)}$$

$$r_t=\sigma(W^{(r)}x_t+U^{(r)}h_{t-1}+b^{(r)})  \quad \text{Equation (9)}$$

$$\tilde{h}_t=\tanh(Wx_t+r_t \circ Uh_{t-1}+b^{(h)})  \quad \text{Equation (10)}$$

$$h_t=z_t \circ h_{t-1}+(1-z_t)\circ \tilde{h}_t  \quad \text{Equation (11)}$$

where $x_t$ is an input vector, $h_t$ is an output vector, $z_t$ is an update gate vector, $r_t$ is a reset gate vector, σ is from a sigmoid function, ° is an element-wise product, and $h_0$=0. Moreover, $W^{(z)}$, $W^{(r)}$, W, $U^{(z)}$, $U^{(r)}$, U are parameter matrices, and $b^{(z)}$, $b^{(r)}$, $b^{(h)}$ are parameter vectors. Here, $W^{(z)}$, $W^{(r)}$, W∈$R^{n_H \times n_I}$, and $U^{(z)}$, $U^{(r)}$, U∈$R^{n_H \times n_H}$, $n_H$ denoting a dimension of a hidden layer, and $n_I$ denoting a dimension of the input vector. For example, in Equation (8), $W^{(z)}$ is a matrix that projects the input vector $x_t$ into a vector space, $U^{(z)}$ is a matrix that projects the recurrent hidden layer $h_{t-1}$ into a vector space, and $b^{(z)}$ is a bias vector that determines a relative position of the target vector $z_t$. Similarly, in Equations (9) and (10), $W^{(r)}$, $U^{(r)}$, $b^{(r)}$ and W, U, $b^{(h)}$ function in the same way as $W^{(z)}$, $U^{(z)}$ and $b^{(z)}$. The above equations may also be abbreviated as $h_t$=GRU($x_t$,$h_{t-1}$).

In addition to encoding the input sequence, a positional encoding with bidirectional GRU may also be applied so as to represent "facts" of the sentences. Fact vectors may be computed as $f_t$=GRU$_{l2r}$(L[$S_t$], $f_{t-1}$)+GRU$_{r2l}$(L[$S_t$], $f_{t-1}$), where l2r denotes left-to-right, r2l denotes right-to-left, $S_t$ is an embedding expression of a current sentence, and $f_{t-1}$, $f_t$ are fact vectors of a former sentence and the current sentence respectively. As shown in FIG. 11, fact vectors $f_1$ to $f_8$ are obtained for the eight sentences in the current session.

Moreover, another positional encoding with bidirectional GRU may also be applied so as to represent "emotions" of the sentences. Emotion vectors may be computed as $e_t$=GRU$_{l2r}$(L[$S'_t$], $e_{t-1}$)+GRU$_{r2l}$(L[$S'_t$], $e_{t-1}$), where l2r denotes left-to-right, r2l denotes right-to-left, $S'_t$ is an emotional embedding expression of a current sentence, and $e_{t-1}$, $e_t$ are emotion vectors of a former sentence and the current sentence respectively. As shown in FIG. 11, emotion vectors $e_1$ to $e_8$ are obtained for the eight sentences in the current session. It should be appreciated that emotional embedding expression of a sentence may be obtained through the embedding layer in FIG. 5.

The framework 1100 may comprise a current message module 1104. At the current message module 1104, a current message $q_5$ that is currently input by the user may be processed. The encoding for the current message $q_5$ is a simplified version of the input module 1102, where there is only one sentence to be processed in the current message module 1104. The processing by the current message module 1104 is similar with the input module 1102. Assuming that there are $T_Q$ words in the current message, hidden states of the encoding at the time step t may be computed as $q_t$=[GRU$_{l2r}$(L[$W_t^Q$], $q_{t-1}$), GRU$_{r2l}$(L[$W_t^Q$], $q_{t-1}$)], where L is an embedding matrix, and e is a word or character index of the t-th word or character in the current message. In a similar way as the input module 1102, a fact vector $f_9$ and an emotion vector $e_9$ may be obtained for the current message $q_5$ in the current message module 1104.

The framework 1100 may comprise a fact response ranking model 1106 for determining one or more candidate fact responses 1112. Inputs to the fact response ranking model 1106 may comprise at least one of: fact vectors of the current session generated by the input model 1102, a fact vector of the current message generated by the current message module 1104, a topic-topic knowledge graph 1108, and QA pairs in a pure chat index set 1110. The topic-topic knowledge graph 1108 may be used for extending the current message to introduce more diverse knowledge from outside. An answer in a QA pair in the pure chat index set 1110 may be denoted as a "response" which may be selected and sent to the user. The fact response ranking model 1106 may compute scores of responses existing in the pure chat index 1110 based on the inputs, and determine the top-ranked one or more responses as the candidate fact responses 1112. In some implementations, a gradient-boosting decision tree (GBDT) model may be adopted by the fact response ranking model 1106 for scoring two sequences. For example, the GBDT may take a current message q and a candidate fact response Q as inputs, and output similarity scores of the candidate fact response Q compared to the current message q.

In an implementation, a feature in the GBDT may be based on a language model for information retrieval. This feature may evaluate relevance between a current message q and a candidate fact response Q through:

$$P(q|Q) = \Pi_{w \in q}[(1-\lambda)P_{ml}(w|Q) + \lambda P_{ml}(w|C)] \quad \text{Equation (12)}$$

where $P_{ml}(w|Q)$ is the maximum likelihood of term w estimated from Q, and $P_{ml}(w|C)$ is a smoothing item that is computed as the maximum likelihood estimation in a large-scale corpus C. Herein, "term" may refer to a word or a phrase. The smoothing item avoids zero probability, which stems from those terms appearing in the current message q but not in the candidate fact response Q. $\lambda$ is a parameter that acts as a trade-off between the likelihood and the smoothing item, where $\lambda \in [0, 1]$. This feature works well when there are a number of overlaps between the current message and the candidate fact response.

In an implementation, a feature in the GBDT may be based on a translation-based language model. This feature may learn word-to-word and/or phrase-to-phrase translation probability from, such as, question-description or QA pairs, and may incorporate the learned information into the maximum likelihood. Given a current message q and a candidate fact response Q, the translation-based language model may be defined as:

$$P_{trb}(q|Q) = \Pi_{w \in q}[(1-\lambda)P_{mx}(w|Q) + \lambda P_{ml}(w|C)] \quad \text{Equation (13)}$$

$$\text{where } P_{mx}(w|Q) = \alpha P_{ml}(w|Q) + \beta P_{tr}(w|Q) \quad \text{Equation (14)}$$

$$P_{tr}(w|Q) = \Sigma_{v \in Q} P_{tp}(w|v) P_{ml}(v|Q) \quad \text{Equation (15)}$$

Here, $\lambda$, $\alpha$ and $\beta$ are parameters satisfying $\lambda \in [0, 1]$ and $\alpha + \beta = 1$. $P_{tp}(w|v)$ is a translation probability from word v in Q to word w in q. $P_{tr}(.)$, $P_{mx}(.)$ and $P_{trb}(.)$ are similarity functions constructed step-by-step by using $P_{tp}(.)$ and $P_{ml}(.)$.

In an implementation, a feature in the GBDT may be an edit distance of word or character level unigrams between a current message and a candidate fact response.

In an implementation, a feature in the GBDT may be a maximum subsequence ratio between a current message and a candidate fact response.

In an implementation, a feature in the GBDT may be a "topic-topic knowledge graph" hitting rate from words in a current message to words in a candidate fact response. For example, if the topic-topic knowledge graph has a mapping from "Natto" to "breakfast", then a current message with "Natto" and a candidate fact response with "breakfast" may trigger this feature, i.e., the "Natto" in the current message hits the "breakfast" in the candidate fact response. Thus, this candidate fact response will have a relatively higher score compared to other candidate fact responses that do not have a word "breakfast".

In an implementation, a feature in the GBDT may be a cosine similarity score from a recurrent neural network containing GRUs. The cosine similarity score may be an evaluation for similarity between a current message and a candidate fact response. The recurrent neural network will be discussed in connection with FIG. 12 to FIG. 14 below.

Figure 12:
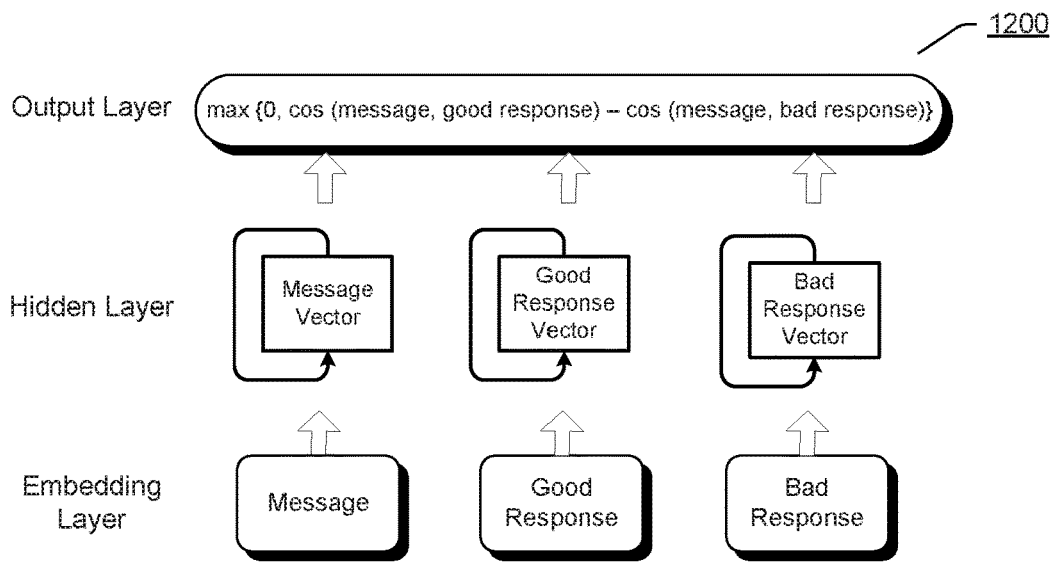
FIG. 12 illustrates an exemplary process for training a recurrent neutral network which is for determining similarity scores according to an embodiment.

FIG. 12 illustrates an exemplary process 1200 for training a recurrent neutral network which is for determining similarity scores according to an embodiment.

Training data may be input in an embedding layer. The training data may comprise a message, a good response and a bad response. The good response may be semantically related to the message, while the bad response may be not semantically related to the message. Assuming that a message is "Do you eat Natto?", then a good response may be "Yes, I eat Natto as breakfast and I heard it's healthy", and a bad response may be "I don't know". The embedding layer may map the input training data into respective dense vector representations.

A hidden layer may use GRU to process the vectors from the embedding layer, e.g., vector of the message, vector of the good response and vector of the bad response. It should be appreciated that there may be one or more hidden layers in the recurrent neural network. Here, the hidden layer may also be referred to as a recurrent hidden layer.

An output layer may compute a margin between similarity of <message, good response> and similarity of <message, bad response>, and maximize the margin. If the similarity of <message, good response> is below the similarity of <message, bad response>, a distance between these two types of similarity may be taken as an error and back propagated to the hidden layer and the embedding layer. In an implementation, the process in the output layer may be expressed as:

$$\max \{0, \cos(\text{message}, \text{good response}) - \cos(\text{message}, \text{bad response})\} \quad \text{Equation (16)}$$

where cos(message, good response) denotes a cosine similarity score between the message and the good response, and cos(message, bad response) denotes a cosine similarity score between the message and the bad response.

Figure 13:
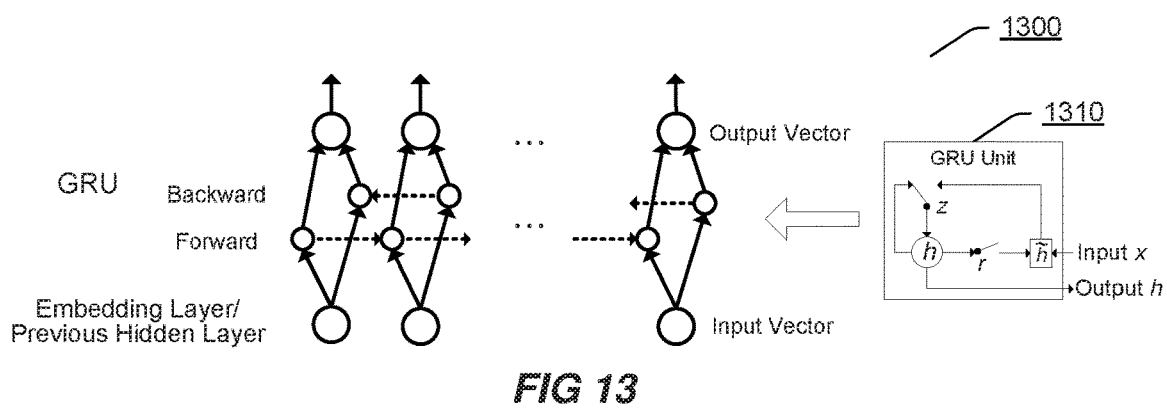
FIG. 13 illustrates an exemplary gated recurrent unit (GRU) process according to an embodiment.

FIG. 13 illustrates an exemplary GRU process 1300 according to an embodiment. The GRU process 1300 may be implemented in the hidden layer shown in FIG. 12.

An input vector for the GRU process may be obtained from an embedding layer or a previous hidden layer. The input vector may also be referred to as input sequence, word sequence, etc.

The GRU process is a type of bidirectional encoding process applied on the input vector. There are two directions in the GRU process, e.g., a left-to-right forward direction and a right-to-left backward direction. The GRU process may involves a plurality of GRU units which take an input vector x and a previous step vector $h_{t-1}$ as inputs and output a next step vector $h_t$. Internal mechanism of the GRU process may follow Equations (8)-(11) as discussed above.

Block 1310 in FIG. 13 shows an exemplary detailed structure of a GRU unit, where x is an input vector for the GRU unit, and h is an output vector for the GRU unit. The GRU unit may be expressed as:

$$h_t^j = z_t^j h_{t-1}^j + (1-z_t^j)\tilde{h}_t^j \qquad \text{Equation (17)}$$

where j is a word index in the input vector x. Processes in both the left-to-right forward direction and the right-to-left backward direction may follow Equation (17).

Figure 14:
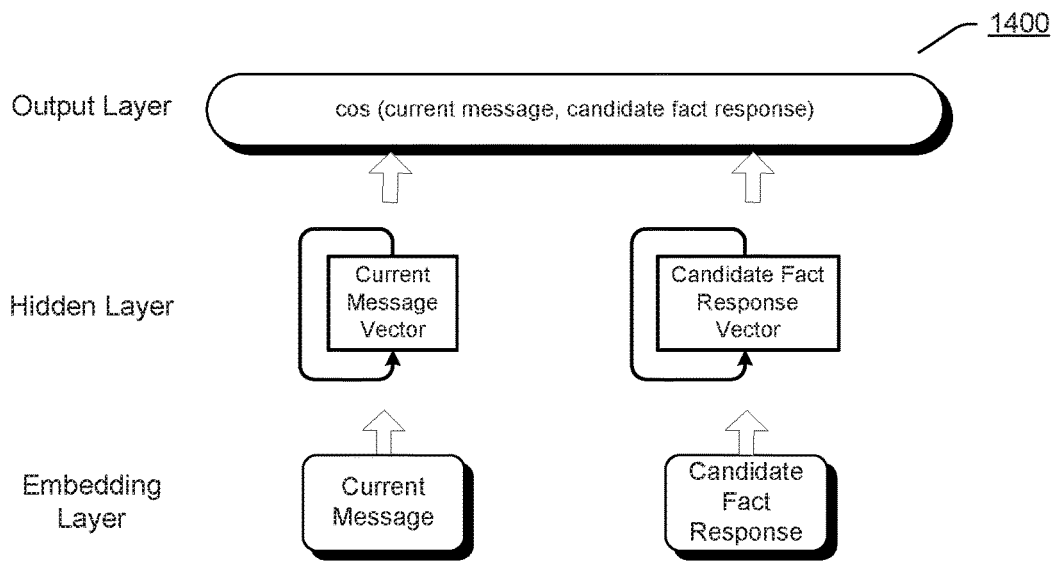
FIG. 14 illustrates an exemplary process for applying a recurrent neutral network for determining similarity scores according to an embodiment.

FIG. 14 illustrates an exemplary process 1400 for applying a recurrent neutral network for determining similarity scores according to an embodiment. The recurrent neutral network may have been trained through the process 1200 shown in FIG. 12.

A current message and a candidate fact response may be input in an embedding layer. The embedding layer may map the input current message and candidate fact response into respective dense vector representations.

A hidden layer may use GRU to process the vectors from the embedding layer, i.e., a vector for the current message and a vector for the candidate fact response. It should be appreciated that there may be one or more hidden layers in the recurrent neural network.

An output layer may compute and output a cosine similarity score between the current message and the candidate fact response, e.g., cos (current message, candidate fact response). The cosine similarity score may be used as a feature in the GBDT for the fact response ranking model 1106.

Return to FIG. 11, the framework 1100 may comprise a fact memory module 1120. The fact memory module 1120 may be a DMN for reasoning out fact memory vectors. The fact memory module 1120 may also be referred to as an episodic memory module. In an implementation, the fact memory module 1120 may comprise an attention mechanism module 1122. Alternatively, the attention mechanism module 1122 may also be separated from the fact memory module 1120. The attention mechanism module 1122 may be based on a gating function.

In a conventional computing process through an episodic memory module and an attention mechanism module, these two modules may cooperate to update episodic memory in an iteration way. For each pass i, the gating function of the attention mechanism module may take a fact $f^i$, a previous memory vector $m^{i-1}$, and a current message q as inputs, to compute an attention gate $g_t^i = G[f^i, m^{i-1}, q]$. To compute the episode $e^i$ for pass i, a GRU over a sequence of inputs, e.g., a list of facts $f^i$, weighted by the gates $g^i$ may be applied. Then the memory vector may be computed as $m^i = \text{GRU}(e^i, m^{i-1})$. Initially, $m^0$ is equal to a vector expression of the current message q. The memory vector that is finally output by the episodic memory module may be the final state $m^x$ of the GRU. The following Equation (18) is for updating hidden states of the GRU at a time step t, and the following Equation (19) is for computing the episode.

$$h_t^i = g_t^i \text{GRU}(f_t, h_{t-1}^i) + (1-g_t^i)h_{t-1}^i \qquad \text{Equation (18)}$$

$$e^i = h_{T_C}^i \qquad \text{Equation (19)}$$

where $T_C$ is the number of input sentences.

While according to the embodiments of the present disclosure, the fact memory module 1120 may perform a topic-based reasoning. For example, a possible response to the current message is not guaranteed to be deduced from the current session. In other words, in order to generate an optimal response, besides reasoning from facts of the current session, external topics may also be considered in the case that the facts of the current session are not sufficient for answering the current message. Accordingly, the fact response ranking model 1106 may be used for determining the candidate fact responses 1112 from open-domain data resources, e.g., the topic-topic knowledge graph 1108 and the pure chat index 1110, and facts of the candidate fact responses 1112 may be provided to the fact memory module 1120 for further multiple-round transition reasoning.

The fact memory module 1120 may make use of fact vectors of the current session and fact vectors of the candidate fact responses. Here, the fact vectors of the candidate fact responses may be computed in a similar way as the fact vectors of the current session. As shown in FIG. 11, fact memory vectors $m^1$ to $m^x$ correspond to a reasoning process starting from exemplary fact vectors $f_1$ to $f_8$ of the current session, and fact memory vectors $m^{x+1}$ to $m^{x+y}$ correspond to a reasoning process starting from fact vectors of exemplary 6 candidate fact responses.

Regarding the attention mechanism module 1122, for each pass i, inputs to the attention mechanism module 1122 may comprise at least one of: fact vector $f_i$ from the current session, a previous fact memory vector $m^{i-1}$ reasoned from fact vectors of the current session, a fact vector $f_9$ of the current message, and a previous fact memory vector $m^{x+i-1}$ reasoned from fact vectors of the candidate fact responses. Thus, an attention gate may be computed as $g_t^i = G[f_i, m^{i-1}, f_9, m^{x+i-1}]$. The scoring function G may produce a scalar score for the feature set $\{f_i, m^{i-1}, f_9, m^{x+i-1}\}$. For example, cosine similarity scores among these vectors may be used for the feature set. Computing results from the attention mechanism module 1122 may be applied in the reasoning process of the fact memory module 1120.

Outputs from the fact memory module 1120 may comprise at least the fact memory vectors $m^x$ and $m^{x+y}$, where $m^x$ is reasoned from the fact vectors of the current session, and $m^{x+y}$ is reasoned from the fact vectors of the candidate fact responses.

The framework 1100 may comprise an emotion response ranking model 1114 for determining candidate emotion responses 1118. Herein, the candidate emotion responses 1118 may be candidate responses having emotional trends. Inputs to the emotion response ranking model 1114 may comprise at least one of: emotion vectors of the current session generated by the input model 1102, an emotion vector of the current message generated by the current message module 1104, an emotion-topic knowledge graph 1116, and QA pairs in the pure chat index set 1110. The emotion-topic knowledge graph 1116 may be used for providing information for guiding optimal emotions in a final response to the current message. The emotion response ranking model 1114 may compute scores of responses existing in the pure chat index 1110 based on the inputs, and determine the top-ranked one or more responses as the candidate emotion responses 1118. In some implementations, a GBDT model may be adopted by the emotion response ranking model 1114 for scoring two sequences. For example, the GBDT may take a current message q and a candidate emotion response Q as inputs, and output similarity scores of the candidate emotion response Q compared to the current message q.

Features in the GBDT for the emotion response ranking model 1114 may be similar with the features in the GBDT for the fact response ranking model 1106, except that "Q" represents a candidate emotion response instead of a candidate fact response and the feature of "topic-topic knowledge graph" hitting rate is replaced by a feature of "emotion-topic knowledge graph" hitting rate from words in a current message to words in a candidate emotion response. For example, if the emotion-topic knowledge graph has a mapping from "Natto" to "healthy", then a current message with "Natto" and a candidate emotion response with "healthy" may trigger this feature, i.e., the "Natto" in the current message hits the "healthy" in the candidate emotion response. Thus, this candidate emotion response will have a relatively higher score compared to other candidate emotion responses that do not have a word "healthy".

The framework 1100 may comprise an emotion memory module 1130. The emotion memory module 1130 may be a DMN for reasoning out emotion memory vectors. In an implementation, the emotion memory module 1130 may comprise an attention mechanism module 1132. Alternatively, the attention mechanism module 1132 may also be separated from the emotion memory module 1130. The attention mechanism module 1132 may be based on a gating function.

According to the embodiments of the present disclosure, the emotion memory module 1130 may perform an emotion-based reasoning. In order to generate an optimal response, besides reasoning from emotions of the current session, external emotions may also be considered in the case that the emotions of the current session are not sufficient for answering the current message. Accordingly, the emotion response ranking model 1114 may be used for determining the candidate emotion responses 1118 from open-domain data resources, e.g., the emotion-topic knowledge graph 1116 and the pure chat index 1110, and emotions of the candidate emotion responses 1118 may be provided to the emotion memory module 1130 for further multiple-round transition reasoning.

The emotion memory module 1130 may make use of emotion vectors of the current session and emotion vectors of the candidate emotion responses. Here, the emotion vectors of the candidate emotion responses may be computed in a similar way as the emotion vectors of the current session. It should be appreciated that, different from fact vectors which may be obtained through, e.g., Word2vec techniques, emotion vectors are obtained through the sentiment analysis classifier as shown in FIG. 5. As shown in FIG. 11, emotion memory vectors $m'^1$ to $m'^x$ correspond to a reasoning process starting from exemplary emotion vectors $e_1$ to $e_8$ of the current session, and emotion memory vectors $m'^{x+1}$ to $m'^{x+y}$ correspond to a reasoning process starting from emotion vectors of exemplary 3 candidate emotion responses.

Regarding the attention mechanism module 1132, for each pass i, inputs to the attention mechanism module 1132 may comprise at least one of: emotion vector $e_i$ from the current session, a previous emotion memory vector $m'^{i-1}$ reasoned from emotion vectors of the current session, an emotion vector $e_9$ of the current message, and a previous emotion memory vector $m'^{x+i-1}$ reasoned from emotion vectors of the candidate emotion responses. Thus, an attention gate may be computed as $g'^i_t = G[e_i, m'^{i-1}, e_9, m'^{x+i-1}]$. The scoring function G may produce a scalar score for the feature set $\{e_i, m'^{i-1}, e_9, m'^{x+i-1}\}$. For example, cosine similarity scores among these vectors may be used for the feature set. Computing results from the attention mechanism module 1132 may be applied in the reasoning process of the emotion memory module 1130.

Outputs from the emotion memory module 1130 may comprise at least the emotion memory vectors $m'^x$ and $m'^{x+y}$, where $m'^x$ is reasoned from the emotion vectors of the current session, and $m'^{x+y}$ is reasoned from the emotion vectors of the candidate emotion responses.

The framework 1100 may comprise an intention prediction module 1140. Usually, a user's intention during a session is not directly observable. For example, as for a message "Eating Natto as breakfast", the user's intention may be about "for healthy", which is not necessarily mentioned directly by words during the session. One of functions of the intention predication module 1140 is to take a current session and a current message as clues for predicting possible hidden intentions of the user.

Training data for this function of predicting intentions in the intention prediction module 1140 may be in a form of <session, message, intention>, wherein "session" and "message" are original inputs, and "intention" is output. The intention may be represented as a vector. Assuming that there are N intentions in total, the vector will be an N-dimension vector, with each dimension being a probability score of a corresponding intention. When preparing the training data, the topic-topic knowledge graph and/or the emotion-topic knowledge graph may be used for collecting relevant topics or emotions to topics of <session, message>, and then "correct" intention may be manually selected from the relevant topics or emotions. If no correct intention is included in the relevant topics and emotions, an intention may be manually labeled. Through this way, training data of <session, message, intention> may be established. Then, the training data may be provided to the framework 1100 in FIG. 11 to obtain fact memory vectors and emotion memory vectors through the fact memory module 1120 and the emotion memory module 1130 respectively, and the fact memory vectors and emotion memory vectors may be taken as a feature set of intermediate inputs to the intention prediction module 1140, meanwhile the vector representing intention in the training data may be taken as an reference for parameter updating. Based on the above training process, the function of predicting intentions in the intention prediction module 1140 may be established.

When applying the intention prediction module 1140, the intention prediction module 1140 may generate an intention vector 1142 based on fact memory vectors and emotion memory vectors through a full-connection layer and a further softmax layer. For example, the invention vector 1142 may be expressed as:

$$\text{softmax}(fc(m^x, m^{x+y}, m'^x, m'^{x+y})) = \text{softmax}(W_1 * m^x + W_2 * m^{x+y} + W_3 * m'^x + W_4 * m'^{x+y}) \quad \text{Equation (20)}$$

where $m^x$ and $m^{x+y}$ are fact memory vectors from the fact memory module 1120, $m'^x$ and $m'^{x+y}$ are emotion memory vectors from the emotion memory module 1130, "fc" denotes a process at the full connection layer, and "softmax" denotes a process at the softmax layer.

The fact and emotion memory vectors may contain information about an attention point, e.g., topic or fact of the attention point, emotion of the attention point, etc. Thus, since the intention prediction module 1140 takes the fact and emotion memory vectors as inputs and then uses the full connection layer and the softmax layer to make prediction, the generated intention vector 1142 may be deemed as an expression in a high-level vector space for both a string-level attention point and a string-level intention. That is, the intention vector 1142 may at least include information about both the string-level attention point and the string-level intention. Here, "string-level" indicates being expressed by words, phrases or sentences, such as, an exemplary string-level attention point may be "like Natto", and an exemplary string-level intention may be "for healthy".

The framework 1100 may further comprise an attention mechanism module 1150 and a response generation module 1160.

The response generation module 1160 may decide a response word-by-word, wherein the response will be provided to the user as a reply to the current message from the user. When deciding each word in the response, the response generation module 1160 may desire to refer to the fact memory vectors, the emotion memory vectors or the intention vector. The attention mechanism module 1150 may be used for determining selection of the fact memory vectors, the emotion memory vectors and the intention vector for use by the response generation module 1160.

The response generation module 1160 may adopt a GRU decoder, and an initial state of the GRU decoder may be initialized to be the last memory vector $a_0$=intention vector=softmax($W_1*m^x+W_2*m^{x+y}+W_3*m^{rx}+W_4*m^{rx+y}$). At a time step t, the GRU decoder may take the current message q, a last hidden state $a_{t-1}$, and a previous output $y_{t-1}$ as inputs, and then compute a current output as:

$$y_t = \text{softmax}(W^{(a)}a_t + W^{(b)}g(a_t, \text{intention vector}, m^x, m^{x+y}, m^{rx}, m^{rx+y}))$$

Equation (21)

where $a_t$=GRU([$y_{t-1}$,q],$a_{t-1}$), and $W^{(a)}$ and $W^{(b)}$ are weight matrices by training.

Here, a beam search may be adopted for searching a candidate list of available next word of $y_t$. For example, at most top-N possible words are kept for the first word in the response, and then the next word may be computed, which also has N possible candidates, and so on. During selecting next words, the attention mechanism module 1150 may evaluate similarity scores of currently generated part of the response with the fact memory vectors, the emotion memory vectors and the intention vector respectively. The attention mechanism module 1150 may use a weight vector {$w_1, w_2, w_3, w_4, w_5$} to record weights of the fact memory vectors, the emotion memory vectors and the intention vector, wherein $w_1$ to $w_4$ are similarity scores between the four memory vectors ($m^x, m^{x+y}, m^{rx}, m^{rx+y}$) and the current candidate word, and $w_5$ is a similarity score between the intention vector and the current candidate word.

The last generated word may be concatenated to the current vector as input at each time step. The generated output by the response generation module 1160 may be trained with a cross-entropy error classification of a correct sequence attached with a "</s>" tag at the end of the sequence.

Finally, a response to the current message may be obtained from the response generation module 1160. Depending on the total process in the framework 1100, on one hand, the response may be deemed as generated based at least on the attention point and the intention, wherein the fact and emotion memory vectors involved in the process may reflect information about the attention point, and the intention vector involved in the process may reflect information about both the attention point and the intention. On the other hand, the response may also be deemed as generated through fact-based reasoning and emotion-based reasoning, wherein the fact memory vectors involved in the process are reasoned out based on the current session and the candidate fact responses, and the emotion memory vectors involved in the process are reasoned out based on the current session and the candidate emotion responses.

It should be appreciated that all the modules, equations, parameters and processes discussed above in connection with FIG. 11 are exemplary, and the embodiments of the present disclosure are not limited to any details in the discussion.

According to the embodiments of the present disclosure, a GAN may be established, which may include a generator and a discriminator. The generator may be based on a DMN for generating responses, and the discriminator may be based on a DSSM. Here, "generator" or "DMN" may generally refer to the framework 1100 in FIG. 11 that is used for generating responses, or specifically refer to the combination of modules that are based on DMN technique in the framework 1100. The GAN may be used for refining or improving the generator. Moreover, the GAN according to the embodiments of the present disclosure may also be referred to as a generative adversarial memory network (GAMN) since DMN is adopted by the generator.

Figure 15:
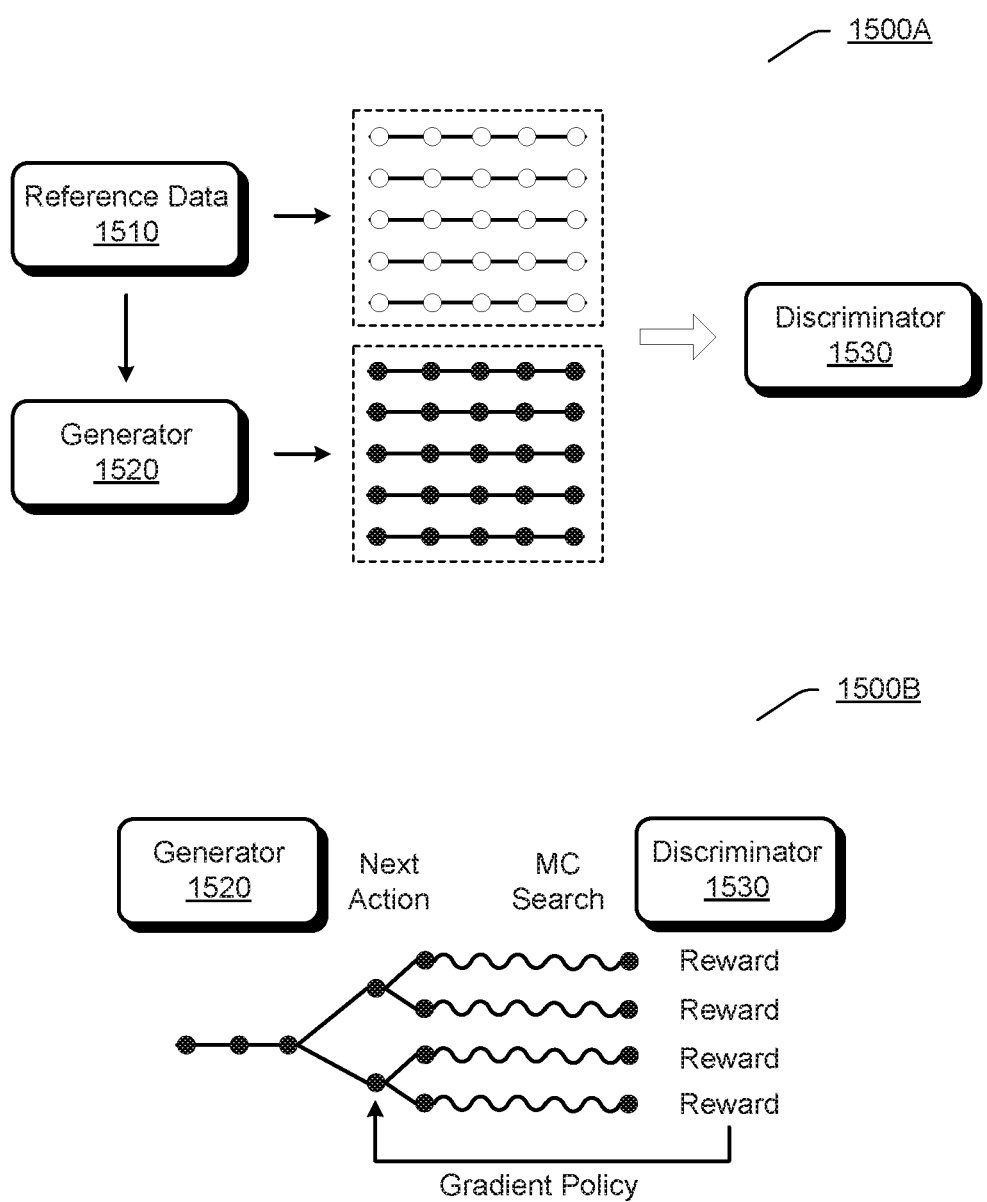
FIG. 15 illustrates an exemplary process for training a generative adversarial network (GAN) according to an embodiment.

FIG. 15 illustrates an exemplary process for training a GAN according to an embodiment.

A procedure 1500A in FIG. 15 shows a training process of a discriminator. In the procedure 1500A, reference data 1510 may be obtained. The reference data 1510 may refer to "correct" or "most appropriate" responses that should be provided by the chatbot to reply to messages from users. The reference data 1510 may be obtained through various approaches, e.g., manually labelled. The reference data may also be referred to as "true data".

Samples may be extracted from the reference data 1510 and provided to a generator 1520. The generator 1520 may output generated data based on the samples of the reference data 1510.

The reference data 1510 and the generated data from the generator 1520 may be used for training a discriminator 1530. The discriminator 1530 may make a decision of classifying an instance into the reference data or the generated data. For example, the discriminator 1530 may be used for estimating a probability that an instance comes from the reference data rather than the generated data.

A procedure 1500B in FIG. 15 shows a training process of a generator. In the procedure 1500B, a feedback from the discriminator 1530 may be used for training the generator 1520. A training goal for the generator 1520 is to maximize a probability that the discriminator 1530 makes a mistake, e.g., falsely classifying an instance of reference data into the generated data or falsely classifying an instance of generated data into the reference data. As shown in the procedure 1500B, the discriminator 1530 may provide a reward for each possible generated data from the generator 1520. The reward may be fed back through a gradient policy from the discriminator 1530 to the generator 1520. In an implementation, the gradient policy may be based on stochastic gradient descent (SGD). The reward may be passed back to an intermediate action, e.g., "next action" shown in FIG. 15, via Monte Carlo (MC) search, wherein the next action may refer to a selection of next word during generating a response, and the MC search may calculate a probability of choosing each action. The reward may influence next action and neural network parameters in the generator 1520.

The training of the discriminator 1530 and the generator 1520 in the procedures 1500A and 1500B may be simultaneously performed, and form an adversarial process. Through this adversarial process, the generator 1520 may be trained and improved gradually.

Moreover, although not shown in FIG. 15, the trained generator 1520 and the trained discriminator 1530 may also be updated when the trained generator 1520 is applied for generating responses. For example, when receiving a message from the user, the generator 1520 may generate a response to the message based on the framework 1100 in FIG. 11 and provide the generated response to the user. If the generated response has a positive feedback from the user, e.g., receiving a further message "Great!" from the user, or is manually labeled as a good response, the generated response may be deemed as a new reference data and may be provided to the training process in FIG. 15 for updating the GAN. For example, the generator and the discriminator in the GAN may be retrained based on the new reference data.

Figure 16:
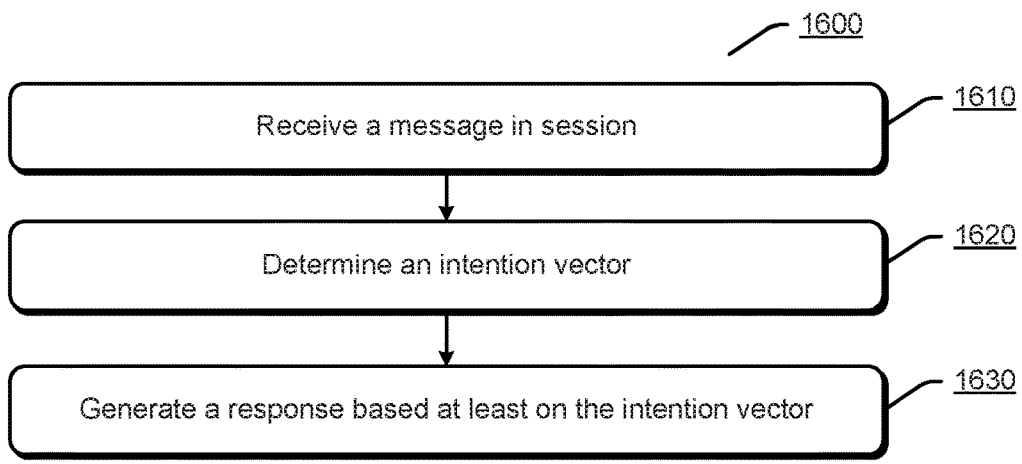
FIG. 16 illustrates a flowchart of an exemplary method for generating responses in automated chatting according to an embodiment.

FIG. 16 illustrates a flowchart of an exemplary method 1600 for generating responses in automated chatting according to an embodiment.

At 1610, a message may be received in a session.

At 1620, an intention vector may be determined based at least on the message and the session through DMN, the intention vector indicating an attention point and an intention.

At 1630, a response may be generated based at least on the intention vector.

In an implementation, the determining the intention vector may comprise: reasoning out at least one fact memory vector based at least on the message and the session; reasoning out at least one emotion memory vector based at least on the message and the session; and generating the intention vector based on the at least one fact memory vector and the at least one emotion memory vector.

The reasoning out the at least one fact memory vector may comprise: reasoning out a first fact memory vector from fact vectors of the session; and reasoning out a second fact memory vector from fact vectors of one or more candidate fact responses.

The method 1600 may further comprise: determining the one or more candidate fact responses based on at least one of the message, the session, a pure chat index and a topic-topic knowledge graph, wherein the topic-topic knowledge graph comprises a plurality of topic phrases that are associated with each other.

In an implementation, the reasoning out the at least one emotion memory vector may comprise: reasoning out a first emotion memory vector from emotion vectors of the session; and reasoning out a second emotion memory vector from emotion vectors of one or more candidate emotion responses.

The method 1600 may further comprise: determining the one or more candidate emotion responses based on at least one of the message, the session, a pure chat index and an emotion-topic knowledge graph, wherein the emotion-topic knowledge graph comprises a plurality of topic phrases and a plurality of emotion phrases that are associated with each other.

In an implementation, the generating the response may comprise: generating the response based at least on the intention vector, the at least one fact memory vector, and the at least one emotion memory vector.

In an implementation, the method 1600 may further comprise: establishing a GAN including a generator and a discriminator, the generator being based at least on the DMN, the discriminator being based on a DSSM.

The discriminator may be trained by reference data and generated data, the generated data being generated by the generator based on samples of the reference data. The generator may be trained through a gradient policy that is based on a reward provided by the discriminator.

The method 1600 may further comprise: determining a new reference data based on the response; and updating the GAN based at least on the new reference data.

In an implementation, the emotion vectors may be generated by a sentiment analysis classifier, a training dataset for the sentiment analysis classifier being obtained through an emotion lexicon, the emotion lexicon being established at least by performing Word2vec word extension and bilingual word alignment on seed emotional words. The sentiment analysis classifier may be a character-level RCNN.

It should be appreciated that the method 1600 may further comprise any steps/processes for generating responses in automated chatting according to the embodiments of the present disclosure as mentioned above.

Figure 17:
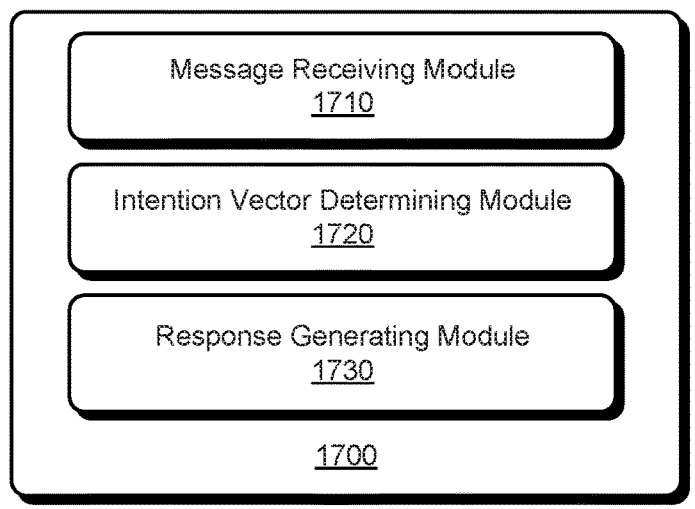
FIG. 17 illustrates an exemplary apparatus for generating responses in automated chatting according to an embodiment.

FIG. 17 illustrates an exemplary apparatus 1700 for generating responses in automated chatting according to an embodiment.

The apparatus 1700 may comprise: a message receiving module 1710, for receiving a message in a session; an intention vector determining module 1720, for determining an intention vector based at least on the message and the session through DMN, the intention vector indicating an attention point and an intention; and a response generating module 1730, for generating a response based at least on the intention vector.

In an implementation, the apparatus 1700 may further comprise: a fact memory module, for reasoning out at least one fact memory vector based at least on the message and the session; and an emotion memory module, for reasoning out at least one emotion memory vector based at least on the message and the session, wherein the intention vector determining module is further for generating the intention vector based on the at least one fact memory vector and the at least one emotion memory vector.

In an implementation, the reasoning out the at least one fact memory vector may comprise: reasoning out a first fact memory vector from fact vectors of the session; and reasoning out a second fact memory vector from fact vectors of one or more candidate fact responses.

The apparatus 1700 may further comprise: a fact response ranking model, for determining the one or more candidate fact responses based on at least one of the message, the session, a pure chat index and a topic-topic knowledge graph, wherein the topic-topic knowledge graph comprises a plurality of topic phrases that are associated with each other.

In an implementation, the reasoning out the at least one emotion memory vector may comprise: reasoning out a first emotion memory vector from emotion vectors of the session; and reasoning out a second emotion memory vector from emotion vectors of one or more candidate emotion responses.

The apparatus 1700 may further comprise: an emotion response ranking model, for determining the one or more candidate emotion responses based on at least one of the message, the session, a pure chat index and an emotion-topic knowledge graph, wherein the emotion-topic knowledge graph comprises a plurality of topic phrases and a plurality of emotion phrases that are associated with each other.

In an implementation, the apparatus 1700 may further comprise: a GAN establishing module, for establishing a GAN including a generator and a discriminator, the generator being based at least on the DMN, the discriminator being based on a DSSM.

The discriminator may be trained by reference data and generated data, the generated data being generated by the generator based on samples of the reference data. The generator may be trained through a gradient policy that is based on a reward provided by the discriminator.

Moreover, the apparatus 1700 may also comprise any other modules configured for generating responses in automated chatting according to the embodiments of the present disclosure as mentioned above.

Figure 18:
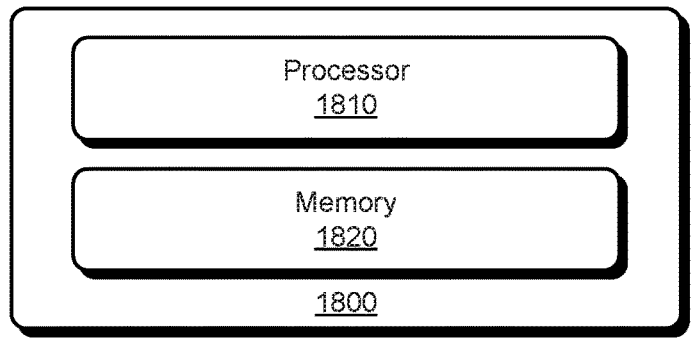
FIG. 18 illustrates an exemplary apparatus for generating responses in automated chatting according to an embodiment.

FIG. 18 illustrates an exemplary apparatus for generating responses in automated chatting according to an embodiment.

The apparatus 1800 may comprise at least one processor 1810. The apparatus 1800 may further comprise a memory 1820 that is connected with the processor 1810. The memory 1820 may store computer-executable instructions that, when executed, cause the processor 1810 to perform any operations of the methods for generating responses in automated chatting according to the embodiments of the present disclosure as mentioned above. Alternatively, the memory 1820 may also be omitted from the apparatus 1800.

The embodiments of the present disclosure may be embodied in a non-transitory computer-readable medium. The non-transitory computer-readable medium may comprise instructions that, when executed, cause one or more processors to perform any operations of the methods for generating responses in automated chatting according to the embodiments of the present disclosure as mentioned above.

It should be appreciated that all the operations in the methods described above are merely exemplary, and the present disclosure is not limited to any operations in the methods or sequence orders of these operations, and should cover all other equivalents under the same or similar concepts.

It should also be appreciated that all the modules in the apparatuses described above may be implemented in various approaches. These modules may be implemented as hardware, software, or a combination thereof. Moreover, any of these modules may be further functionally divided into sub-modules or combined together.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout the present disclosure. The functionality of a processor, any portion of a processor, or any combination of processors presented in the present disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, threads of execution, procedures, functions, etc. The software may reside on a computer-readable medium. A computer-readable medium may include, by way of example, memory such as a magnetic storage device (e.g., hard disk, floppy disk, magnetic strip), an optical disk, a smart card, a flash memory device, random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout the present disclosure, the memory may be internal to the processors (e.g., cache or register).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skill in the art are expressly incorporated herein by reference and are intended to be encompassed by the claims.

What is claimed is:

1. A method for using a dynamic memory network (DMN) to generate responses in automated chatting, said method comprising:
   receiving a message in a session;
   determining an intention vector based at least on the message and the session through a DMN, the intention vector indicating an attention point and an intention, wherein:
      a fact memory vector and an emotion memory vector is generated and is used to determine the intention vector,
      a recurrent convolutional neural network (RCNN) encodes both semantic and orthographic information from characters provided within the session,
      the RCNN includes an embedding layer, the embedding layer converts the characters into a dense vector space to enable generation of at least the emotion memory vector,
      when the factor memory vector is generated, the fact memory vector is generated based on a candidate fact response that is based on one or more of the message, the session, a pure chat index, or a topic-topic knowledge graph, and
      when the emotion memory vector is generated, the emotion memory is generated based on a candidate emotion response that is based on one or more of the message, the session, the pure chat index, or an emotion-topic knowledge graph; and
   generating a response based at least on the intention vector.

2. The method of claim 1, wherein determining the intention vector comprises:
   reasoning out the fact memory vector based at least on the message and the session;
   reasoning out the emotion memory vector based at least on the message and the session; and
   generating the intention vector based on the fact memory vector and the emotion memory vector.

3. The method of claim 2, wherein reasoning out the fact memory vector comprises:
   reasoning out a first fact memory vector from fact vectors of the session; and
   reasoning out a second fact memory vector from one or more fact vectors of the candidate fact response.

4. The method of claim 3, further comprising:
   determining the candidate fact response based on a combination of the message, the session, the pure chat index and the topic-topic knowledge graph, wherein the topic-topic knowledge graph comprises a plurality of topic phrases that are associated with each other.

5. The method of claim 2, wherein reasoning out the emotion memory vector comprises:
reasoning out a first emotion memory vector from emotion vectors of the session; and
reasoning out a second emotion memory vector from one or more emotion vectors of the candidate emotion response.

6. The method of claim 5, further comprising:
determining the candidate emotion response based on a combination of the message, the session, the pure chat index, and the emotion-topic knowledge graph,
wherein the emotion-topic knowledge graph comprises a plurality of topic phrases and a plurality of emotion phrases that are associated with each other.

7. The method of claim 1, further comprising:
establishing a generative adversarial network (GAN) including a generator and a discriminator, the generator being based at least on the DMN, the discriminator being based on a deep semantic similarity model (DSSM).

8. The method of claim 7, wherein:
the discriminator is trained by reference data and generated data, the generated data being generated by the generator based on samples of the reference data, and
the generator is trained through a gradient policy that is based on a reward provided by the discriminator.

9. The method of claim 8, further comprising:
determining a new reference data based on the response; and
updating the GAN based at least on the new reference data.

10. The method of claim 5, wherein the emotion vectors are generated by a sentiment analysis classifier, a training dataset for the sentiment analysis classifier being obtained through an emotion lexicon, the emotion lexicon being established at least by performing Word2vec word extension and bilingual word alignment on seed emotional words.

11. The method of claim 10, wherein the sentiment analysis classifier is a character-level recurrent convolutional neural network (RCNN).

12. An apparatus for generating responses in automated chatting, where a recurrent convolutional neural network (RCNN) is configured to analyze characters provided within the automated chatting, said apparatus comprising:
a message receiving module, for receiving a message in a session;
an intention vector determining module, for determining an intention vector based at least on the message and the session through dynamic memory network (DMN), the intention vector indicating an attention point and an intention;
the RCNN, which is configured to encode both semantic and orthographic information from characters provided within the session, wherein said information is used to generate an emotion memory vector, and wherein the RCNN includes an embedding layer that converts the characters into a dense vector space to enable generation of the emotion memory vector; and
a response generating module, for generating a response based at least on the intention vector and on the emotion memory vector.

13. The apparatus of claim 12, further comprising:
a fact memory module, for reasoning out at least one fact memory vector based at least on the message and the session; and
an emotion memory module, for reasoning out the emotion memory vector based at least on the message and the session,
wherein the intention vector determining module is further for generating the intention vector based on the at least one fact memory vector and the emotion memory vector.

14. The apparatus of claim 13, wherein reasoning out the at least one fact memory vector comprises:
reasoning out a first fact memory vector from fact vectors of the session; and
reasoning out a second fact memory vector from fact vectors of one or more candidate fact responses.

15. The apparatus of claim 14, further comprising:
a fact response ranking model, for determining the one or more candidate fact responses based on at least one of the message, the session, a pure chat index and a topic-topic knowledge graph,
wherein the topic-topic knowledge graph comprises a plurality of topic phrases that are associated with each other.

16. The apparatus of claim 13, wherein reasoning out the emotion memory vector comprises:
reasoning out a first emotion memory vector from emotion vectors of the session; and
reasoning out a second emotion memory vector from emotion vectors of one or more candidate emotion responses.

17. The apparatus of claim 16, further comprising:
an emotion response ranking model, for determining the one or more candidate emotion responses based on at least one of the message, the session, a pure chat index and an emotion-topic knowledge graph,
wherein the emotion-topic knowledge graph comprises a plurality of topic phrases and a plurality of emotion phrases that are associated with each other.

18. The apparatus of claim 12, further comprising:
a generative adversarial network (GAN) establishing module, for establishing a GAN including a generator and a discriminator, the generator being based at least on the DMN, the discriminator being based on a deep semantic similarity model (DSSM).

19. The apparatus of claim 18, wherein
the discriminator is trained by reference data and generated data, the generated data being generated by the generator based on samples of the reference data, and
the generator is trained through a gradient policy that is based on a reward provided by the discriminator.

20. The apparatus of claim 18, wherein the RCNN further includes a convolutional layer, a recurrent layer, and an output layer.

* * * * *